United States Patent
Kim et al.

(10) Patent No.: US 9,491,392 B2
(45) Date of Patent: Nov. 8, 2016

(54) DISPLAY DEVICE, USER TERMINAL APPARATUS AND CONTROL METHOD THEREOF

(71) Applicant: SAMSUNG ELECTRONICS CO., LTD., Suwon-si (KR)

(72) Inventors: Wan-su Kim, Anyang-si (KR); Se-hun Shim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/024,254

(22) Filed: Sep. 11, 2013

(65) Prior Publication Data

US 2014/0313419 A1 Oct. 23, 2014

(30) Foreign Application Priority Data

Apr. 22, 2013 (KR) .................. 10-2013-0044130
May 21, 2013 (KR) .................. 10-2013-0057227

(51) Int. Cl.
*H04N 5/44* (2011.01)
*H04N 21/258* (2011.01)
(Continued)

(52) U.S. Cl.
CPC ...... *H04N 5/4403* (2013.01); *H04N 21/25891* (2013.01); *H04N 21/4108* (2013.01); *H04N 21/4131* (2013.01); *H04N 21/4223* (2013.01); *H04N 21/4227* (2013.01); *H04N 21/42203* (2013.01); *H04N 21/42207* (2013.01); *H04N 21/42226* (2013.01); *H04N 21/4394* (2013.01); *H04N 21/43615* (2013.01); *H04N 21/43635* (2013.01); *H04N 21/43637* (2013.01); *H04N 21/44008* (2013.01); *H04N 21/44227* (2013.01);
(Continued)

(58) Field of Classification Search
CPC . H04N 5/4403; H04N 5/44582; H04N 21/47

USPC .................. 348/552, 553, 734; 709/227
See application file for complete search history.

(56) References Cited

U.S. PATENT DOCUMENTS 8,098,337 B2   1/2012   Martch
8,502,925 B2   8/2013   McRae
(Continued)

FOREIGN PATENT DOCUMENTS

JP   2010-268442 A   11/2010
KR   1020120083159 A   7/2012
KR   1020120126472 A   11/2012

OTHER PUBLICATIONS

International Search Report dated Apr. 22, 2014 from the International Searching Authority corresponding International Application No. PCT/KR2013/012436.

(Continued)

*Primary Examiner* — Michael Lee
(74) *Attorney, Agent, or Firm* — Sughrue Mion, PLLC

(57) ABSTRACT

A control method of a display device includes receiving identification (ID) information of an electronic devices connected to the display device; determining whether a remote controller includes a control setting for the electronic device based on the received ID information, wherein the remote controller controls a plurality of electronic devices associated with the display device; obtaining a control key of the remote controller corresponding to the ID information when it is determined that the remote controller does not include the control setting for the electronic device; and transmitting the obtained control key to the remote controller.

18 Claims, 21 Drawing Sheets

(51) Int. Cl.
*H04N 21/41* (2011.01)
*H04N 21/422* (2011.01)
*H04N 21/4223* (2011.01)
*H04N 21/4227* (2011.01)
*H04N 21/436* (2011.01)
*H04N 21/4363* (2011.01)
*H04N 21/439* (2011.01)
*H04N 21/44* (2011.01)
*H04N 21/442* (2011.01)
*H04N 21/485* (2011.01)
*H04N 21/6543* (2011.01)
*H04N 21/658* (2011.01)
*H04N 21/81* (2011.01)

(52) U.S. Cl.
CPC ........ *H04N 21/485* (2013.01); *H04N 21/6543* (2013.01); *H04N 21/6582* (2013.01); *H04N 21/8186* (2013.01)

(56) References Cited

U.S. PATENT DOCUMENTS

| | | | |
|---|---|---|---|
| 2006/0200538 A1* | 9/2006 | Yuh et al. | 709/219 |
| 2008/0271073 A1 | 10/2008 | Kim et al. | |
| 2009/0001161 A1* | 1/2009 | Uchiyama | 235/382 |
| 2009/0249420 A1* | 10/2009 | Kim et al. | 725/115 |
| 2010/0013998 A1 | 1/2010 | Mortensen | |
| 2010/0079682 A1 | 4/2010 | Martch | |
| 2011/0114716 A1* | 5/2011 | Pratt | 235/375 |
| 2011/0157478 A1 | 6/2011 | McRae | |
| 2012/0041925 A1 | 2/2012 | Pope et al. | |
| 2012/0146918 A1 | 6/2012 | Kreiner et al. | |
| 2012/0180093 A1 | 7/2012 | Ishihara et al. | |
| 2013/0171981 A1* | 7/2013 | Woo | 455/420 |
| 2014/0146233 A1 | 5/2014 | Arling et al. | |
| 2014/0218620 A1 | 8/2014 | Griffin et al. | |

OTHER PUBLICATIONS

Communication dated Sep. 9, 2014 issued by the United States Patent and Trademark Office in counterpart U.S. Appl. No. 14/167,371.

Communication dated Jan. 23, 2015, issued by the United States Patent and Trademark Office in counterpart U.S. Appl. No. 14/167,371.

Communication issued Sep. 11, 2015, issued by the United States Patent and Trademark Office in counterpart U.S. Appl. No. 14/167,371.

Communication issued Jul. 22, 2015, issued by the United States Patent and Trademark Office in counterpart U.S. Appl. No. 14/167,371.

* cited by examiner

DISPLAY DEVICE, USER TERMINAL APPARATUS AND CONTROL METHOD THEREOF

CROSS-REFERENCE TO RELATED APPLICATION

This application claims priorities from Korean Patent Application No. 10-2013-0044130, filed on Apr. 22, 2013, and Korean Patent Application No. 10-2013-0057227, filed on May 21, 2013, in the Korean Intellectual Property Office, the disclosures of which are incorporated herein by reference in their entireties.

BACKGROUND

1. Field

Apparatuses and methods consistent with the exemplary embodiments relate to a display device, a user terminal apparatus and a control method thereof, and more particularly, to a display device which receives identification (ID) information of peripheral electronic devices connected to the display device, receives a control key of a remote controller with respect to electronic devices to which no remote controller has been set, and transmits the control key to the remote controller, a user terminal apparatus which receives ID information of electronic devices through an image and an audio, and receives a control key corresponding to the electronic devices, and remotely controls the electronic devices with the received control key, and a control method thereof.

Apparatuses and methods consistent with the exemplary embodiments further relate to a display device, a user terminal apparatus and a control method thereof which allows a user to remotely control electronic devices with the user terminal apparatus or the display device if a user logs in to a user account of the user terminal apparatus or the display device.

2. Description of the Related Art

A multi-brand remote control (MBR) function is used to control devices connected to a television (TV) with a single remote controller of a smart TV or a user terminal apparatus having a remote control function. Thus, by using the MBR function, various devices such as a home theater, a blue-ray player, a set-top box and other electronic devices connected to the TV may be controlled by a single remote controller.

To set a remote controller, a user needs to manipulate a remote control setting menu, set an input port and perform a remote controller operation test for each type of remote controllers. If the remote controller does not operate, the user needs to input a model name of peripheral devices (e.g., a home theater, a blue-ray player, a set-top box, etc.).

The user is provided with a complicated setting screen for remote controller setting and needs to set, for example, channel up/down and menu keys. If the remote controller does not operate, the user needs to find a normally operating remote controller by switching each type of the remote controllers.

During the remote controller setting, the user may set channel input and press menu keys for each type of remote controllers. If the remote controller does not operate, the user needs to repeat an operation test all over again for each type of remote controllers until the user finds a normally operating remote controller control key. This causes inconvenience to the user in performing the operation test. If the remote controller setting is not performed even after changing the type of the remote controller, the user needs to find and input a manufacturer and a model name. Even if the device has the remote controller setting previously performed thereon, if the input port is changed, the remote controller setting needs to be performed again.

Recently, TV peripheral devices (e.g., a set-top box, a home theater, a blue-ray player, etc.) support high definition multimedia interface (HDMI). Thus, it is required to automatically set data of the TV peripheral devices including the manufacturer and the model name as consumer electronics control (CEC) information through HDMI-CEC rather than directly setting the remote controller by the user. In this manner, a complicated setting process may be avoided and a simple and easy remote controller setting may be achieved.

Further, in finding the control key of the remote controller, the user is required to perform a complicated setting process including inputting the model name, and remote control setting information of the electronic device is not shared between the remote controller and the user terminal apparatus. If a remote control setting is performed for an electronic device which may be wirelessly connected, the user needs to input the ID information, e.g., the model name, etc. of the electronic device, which causes inconvenience to the user.

If a remote control is to be set through a remote control application of the user terminal apparatus, a remote control setting screen is displayed. If the user does not know the ID information, e.g., the model name, of the electronic device for which the remote control is to be set, the user needs to search for and input the model name of the electronic device. Such complicated setting processes causes inconvenience to the user.

SUMMARY

Accordingly, one or more exemplary embodiments provide a display device and a control method thereof which obtains ID information of peripheral electronic devices connected to the display device, receives a control key of a remote controller corresponding to an electronic device, to which no remote controller has been set, and transmits the control key to the remote controller to automatically set the control key based on the ID information, and a user terminal and a control method thereof which receives ID information of an electronic device through an image and an audio, receives a control key corresponding to the electronic device, and remotely controls the electronic device by using the received control key.

Another exemplary embodiment is to provide a user terminal apparatus, a display device, and a control method thereof which logs in a user account of an external server through the user terminal or the display device, and performs remote control setting for an electronic device through the user terminal apparatus and a remote controller without much difficulty.

According to an exemplary embodiment, provided is a control method of a display device, the control method including: receiving identification (ID) information of an electronic device connected to the display device; determining whether a remote controller includes a control setting for the electronic device based on the received ID information, wherein the remote controller controls a plurality of electronic devices associated with the display device; obtaining a control key of the remote controller corresponding to the ID information when it is determined that the remote controller does not include the control setting for the electronic device; and transmitting the obtained control key to the remote controller.

The ID information may include information of at least one of a manufacturer and a model name of the electronic device.

The receiving may include receiving the ID information from the electronic device through high definition multimedia interface-consumer electronics control (HDMI-CEC).

The receiving may further include determining whether an HDMI connection port is changed; and changing an HDMI connection port setting and receiving the ID information from the electronic device using the changed HDMI connection port setting when the HDMI connection port is changed.

The obtaining may include receiving the control key from the electronic device.

The obtaining may include requesting an external server to transmit the control key corresponding to the ID information of the electronic devices and receiving the control key from the external server.

The control method may further include notifying a user of the electronic devices for which no control setting has been performed on the remote controller and displaying a user interface (UI) for a user to select performing control setting of the electronic device.

According to another exemplary embodiment, provided is a display device including: an interface part configured to receive ID information of an electronic device connected to the display device; a communication part configured to transmit and receive data; and a controller configured to determine whether a remote controller which remotely controls a plurality of electronic devices associated with the display device includes a control setting of the electronic device, based on the received ID information, and when it is determined the remote controller does not include the control setting of the electronic device, control the communication part to obtain a control key of the remote controller corresponding to the ID information and transmit the obtained control key to the remote controller.

The ID information may include information of at least one of a manufacturer and a model name of the electronic devices.

The interface part may be connected to the display device through an HDMI, and the controller may control the interface part to receive the ID information of the electronic device from the display device through the HDMI.

The controller may determine whether an HDMI connection port has been changed, and if so, change an HDMI connection port setting and receives the ID information using the changed HDMI connection porting setting.

The controller may receive the control key from the electronic device.

The controller may request an external server to transmit the control key corresponding to the ID information of the electronic device and receive the ID information from the external server.

The display device may further include a user interface (UI) generator configured to display a UI, and the controller may notify the electronic device for which no control setting has been performed on the remote controller, and control the UI generator to display a UI for a user to select performing control setting of the electronic device.

According to still another exemplary embodiment, provided is a control method of a user terminal apparatus, the control method including: executing an application for remote control of an electronic device; inputting ID information of the electronic device including at least one of an image and an audio related to the electronic device; obtaining a control key corresponding to the electronic device based on the input ID information; and remotely controlling the electronic device by using the obtained control key.

The inputting may include analyzing the at least one of the received image and the received audio and determining the ID information of the electronic device.

The executing may include identifying the electronic device which is capable of connecting to the user terminal apparatus and a display device associated with the electronic device.

The obtaining may include setting a connection port with respect to the electronic device and the display device, respectively.

The obtaining the control key may include receiving the control key from at least one of the electronic device, the display device, and an external server.

The control method may further include: connecting to an external server and logging in a user account of the external server; and transmitting remote control setting information corresponding to the electronic device to the external server to upload the remote control setting information to the user account.

The remote control setting information may include the control key corresponding to the electronic devices.

According to still another exemplary embodiment, provided is a user terminal apparatus including: an input part configured to receive ID information of an electronic device including at least one of an image and an audio related to the electronic device; a storage configured to store an application for remote control of the electronic device; a communication part configured to transmit and receive data; and a controller configured to obtain a control key corresponding to the electronic device based on the input ID information and controls the application to remotely control the electronic device by using the obtained control key.

The input part may include a camera to capture the image and a microphone to receive the audio, and the controller may analyze the captured image and the received audio and determine the ID information of the electronic device.

The controller may identify the electronic device which is capable of connecting to the user terminal apparatus and a display device associated with the electronic device.

The controller may set a connection port with respect to the electronic device and the display device, respectively.

The controller may receive the control key from at least one of the electronic device, the display device, and an external server.

The controller may be connected to an external server and logs in a user account of the external server and transmit remote control setting information corresponding to the electronic device to the external server to upload the remote control setting information to the user account.

The remote control setting information may include the control key corresponding to the electronic device.

According to still another exemplary embodiment, provided is a control method of a user terminal apparatus, the control method including: connecting to an external server and logging in to a user account of the external server; receiving remote control setting information of an electronic device uploaded to the user account; and remotely controlling the electronic device by using the received setting information.

According to still another exemplary embodiment, provided is a user terminal apparatus including: a communication part configured to transmit and receive data; a user input part configured to receive a user's input; and a controller configured to control the communication part to be connected to an external server and log in the external server with a user account, to receive remote control setting information of an electronic device uploaded to the user account, and to remotely control the electronic device by using the received setting information.

According to still another exemplary embodiment, provided is a control method of a display device, the control method including: obtaining remote control setting information corresponding to an electronic device connected to the display device; transmitting the obtained remote control setting information to a remote controller; connecting to an external server and logging in the external server with a user account; and transmitting the remote control setting information to the external server to be uploaded to the user account.

According to still another exemplary embodiment, provided is a display device including: a communication part configured to transmit and receive data; a receiver configured to receive a user's input; and a controller configured to control the communication part to obtain remote control setting information corresponding to an electronic device connected to the display device, to transmit the obtained remote control setting information to a remote controller of the display device, and to transmit the remote control setting information to an external server to be uploaded to the user account.

According to still another exemplary embodiment, provided is a control method of a display device, the control method including: connecting to an external server and logging in to the external server with a user account; obtaining remote control setting information of an electronic device uploaded to the user account; and transmitting the obtained remote control setting information to a remote controller of the display device.

According to still another exemplary embodiment, provided is a display device including: a communication part configured to transmit and receive data; a receiver configured to receive a user's input; and a controller configured to control the communication part to connect to an external server and log in to the external server with a user account, to receive remote control setting information of an electronic device connected to the display device, which is uploaded to the user account, and to transmit the obtained remote control setting information to a remote controller of the display device.

According to still another exemplary embodiment, provided is a user terminal apparatus including: a storage configured to store an application for remote control of a plurality of electronic devices, connected to the user terminal apparatus, and ID information of the plurality of electronic devices; a user input part configured to receive a user command for remote control of an electronic device among the plurality of electronic devices; a communication part configured to transmit and receive data; and a controller configured to, in response to the user command, determine whether remote control setting is performed for the electronic device, control the communication part to obtain a control key corresponding to the electronic device based on ID information of the electronic device, and control the application to remotely control the electronic device by using the obtained control key.

The user terminal apparatus may further include a display unit, wherein the ID information is stored and displayed in an image on the display unit.

When the image displayed on the display unit is selected, the application for remote control may be executed with respect to an electronic device of which ID information corresponds to the selected image.

The communication part may obtain the control key corresponding to the electronic device from the electronic device.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
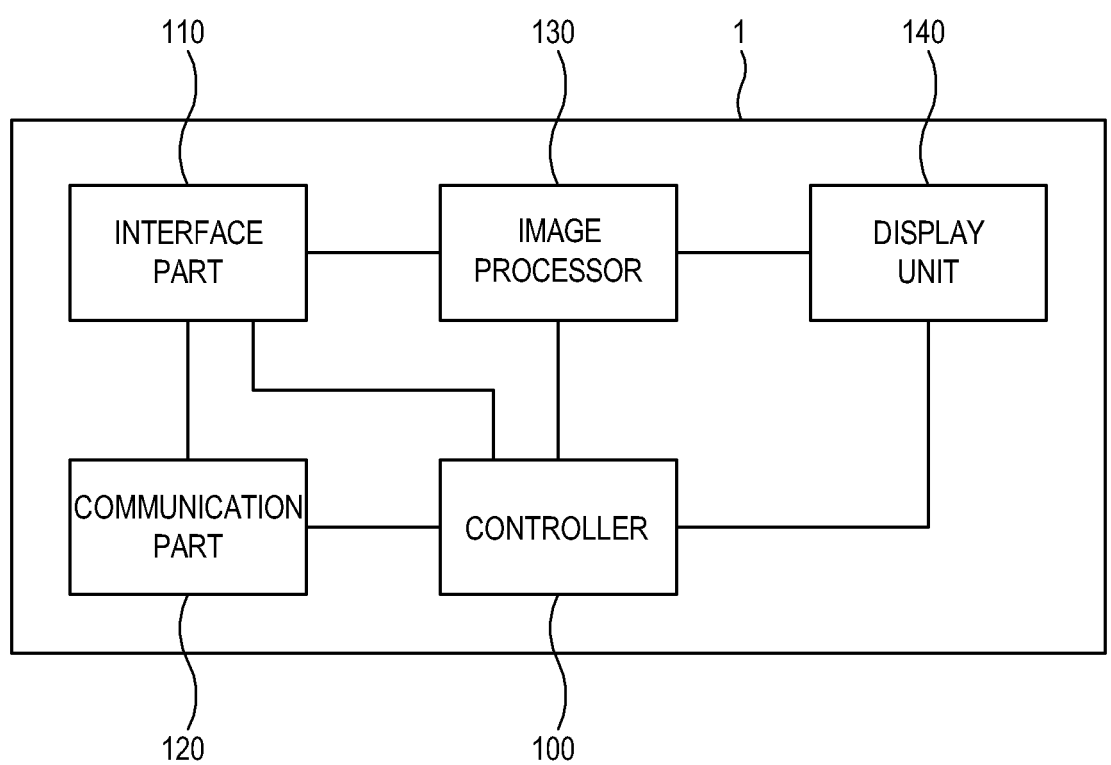
FIG. 1 is a block diagram of a display device according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of a display device 1 according to an exemplary embodiment. As shown in FIG. 1, the display device 1 according to an exemplary embodiment may include an interface part 110, a communication part 120, an image processor 130, a display unit 140, and a controller 100.

The interface part 110 exchanges data with an external input source. The external input source may include a graphic card to convert generated data into an image signal and transmit the image signal to the display device 1, and may store therein a predetermined graphic card patch to correct colors of the image signal. The external input source may be implemented as a personal computer (PC), but not limited thereto. The interface part 110 may exchange data with the external input source through, for example, digital visual interface (DVI), component, high definition multimedia interface (HDMI) or serial digital interface (SDI).

The interface 110 operates to transmit a signal from a connector (not shown) to the controller 100 or to the image processor 130, or transmit a signal from the controller 100 or the image processor 130 to the connector. The interface part 110 relays and transmits signals and acts as an interface for signals among elements of the display device 1. In the exemplary embodiment, the interface part 110 is shown as separate from the image processor 130 and controller 100, but not limited thereto. Alternatively, the interface part 110 may be integrally formed with the image processor 130 or the controller 100 or may be incidental thereto.

If the connector is based on a universal serial bus (USB), the interface part 110 may be implemented as a USB controller module which is connected to the connector and controls transmission of signals through the connector.

The communication part 120 receives an external input signal and transmits the signal to the image processor 130. The communication part 120 may be connected to various types of external input cables and may receive an external input signal in a wired manner or in a wireless manner according to a predetermined wireless communication specification.

The communication part 120 may include a plurality of connectors (not shown) to which respective cables are connected independently. The communication part 120 may receive signals from connected external inputs, e.g., broadcasting signals, image signals, and data signals according to high definition multimedia interface (HDMI), universal serial bus (USB), or component, or receive communication data through a communication network.

In addition to elements for receiving signals and/or data from the connected external inputs, the communication part 120 may further include various elements such as a wireless communication module (not shown) for wireless communication or a tuner (not shown) for turning broadcasting signals depending on a design type of the display device 1. The communication part 120 may transmit information including data and/or signals of the display device 1 to an external device as well as receiving signals from the external device. That is, the communication part 120 is not limited to receiving signals from an external device and may be implemented as an interface for interactive communication. The communication part 120 may receive a control signal from a plurality of control devices to select a user interface (UI). The communication part 120 may include a communication module for wireless local area communication such as Bluetooth, Infrared (IR), Ultra Wideband (UWB), or Zigbee, or include a communication port for wired communication. The communication part 120 may be used for various purposes including transmission and reception of data and commands for manipulating the display device 1 as well as receiving control signals for selecting a UI.

An image processing operation of the image processor 130 may include a decoding operation corresponding to an image format of image data, a de-interlacing operation for converting interlace image data into progressive image data, a scaling operation for adjusting image data into a preset resolution, a noise reduction operation for improving a quality of an image, a detail enhancement operation, a frame refresh rate conversion, etc.

The image processor 130 may be implemented as a system-on-chip (SoC) which integrates the aforementioned functions or may be implemented as an image processing board (not shown), which is provided by installing elements for performing the aforementioned processes in a printed circuit board (PCB). The image processor 130 may be installed in the display device 1.

The image processor 130 processes a predetermined image signal to display an image based on the processed image signal. The image processor 130 may further process an image signal to display an image including at least one graphic user interface (GUI) based on the processed image signal. The image which is processed by the image processor 130 may be output to, and displayed by, the display device 1. The display device 1 may be, for example, a monitor or a television (TV).

The display unit 140 may display an image thereon based on an image signal output from the image processor 130. The display unit 140 may be implemented as various displays such as a liquid crystal display (LCD), a plasma display panel (PDP), a light emitting diode (LED), an organic light emitting diode (OLED), a surface-conduction electron-emitter, a carbon nano-tube, a nano-crystal, etc., but not limited thereto.

The display unit 140 may further include additional elements depending on an embodiment. For example, when the display unit 140 is implemented as an LCD, the display unit 140 may include an LCD panel (not shown), a backlight unit (not shown) which emits light to the LCD panel, and a panel driving substrate (not shown) which drives the LCD panel.

The display unit 140 displays an image thereon based on the image signal processed by the image processor 130. The display unit 140 may include an LCD, a PDP or an OLED but not limited thereto. In this case, the display unit 140 may further include an LCD panel, a PDP panel or an OLED panel.

The display unit 140 may display thereon images and perform a color correction process. The display unit 140 may include a display panel (not shown) to display an image thereon, and a panel driver (not shown) to process an input image signal and display an image on the display panel based on the processed image signal. The display unit 140 is not limited to a particular implementation type. The image signal which is received by the interface part 110 from the external input source may be processed, e.g., decoded, deinterlaced, or scaled to be displayed on the display unit 140.

The controller 100 may control overall internal elements of the display device 1. The controller 100 checks whether a control setting of a remote controller has already been performed to remotely control a plurality of electronic devices based on received identification (ID) information, and if not, the controller 100 may control the communication part 120 to receive a control key of the remote controller corresponding to the received ID information and to transmit the received control key to the remote controller.

Figure 2:
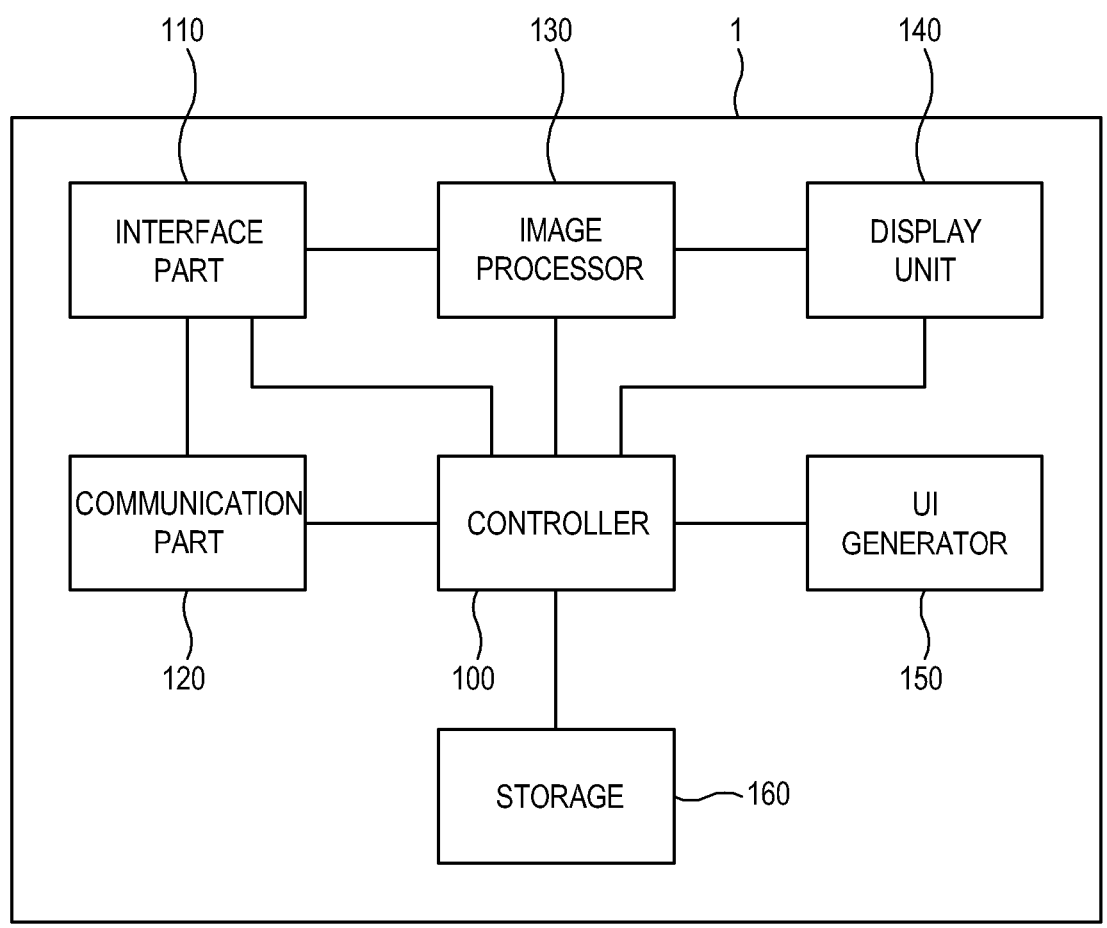
FIG. 2 is a block diagram of a display device according to another exemplary embodiment.

FIG. 2 is a block diagram of the display device 1 according to another exemplary embodiment. As shown in FIG. 2, the display device 1 according to another exemplary embodiment may further include a UI generator 150 and a storage 160 as well as the elements shown in FIG. 1.

The UI generator 150 may generate a UI to operate an executed application program. The generated UI may include a plurality of sub UIs in a form of icons or texts. If a user selects a particular sub UI through the display device 1, an application program may be operated corresponding to the selected sub UI. That is, respective sub UIs may be generated in a unit of function or event to operate the application program executed by the display device 1.

The UI generator 150 provides software or hardware functionality for generating and controlling a UI displayed on the display unit 140, and such functionality may be performed by the controller 100. That is, there is no need to implement the UI generator 150 to include an additional chipset or a microprocessor.

The storage 160 may include a writable read only memory (ROM) in which data remain even when power is cut off from the display device 1, and any change may be reflected in respect of the user. That is, the storage 160 may be implemented as, for example, a flash memory, an erasable programmable read only memory (EPROM), or an electrically erasable programmable read only memory (EEPROM).

The controller 100 may receive a control key from electronic devices connected to the display device 1. When the electronic devices have no control key, the electronic devices may request an external server to transmit a control key corresponding to a model of the electronic devices and receive the control key therefrom. The ID information may include, for example, a manufacturer and a model name of the electronic devices. The interface part 110 is connected to the controller 100 through HDMI, and the controller 100 may control the interface part 110 to receive ID information of the plurality of electronic devices. The display device 1 may include the UI generator 150 to display a UI which is used to select a control setting. The controller 100 may notify the electronic devices, for which no control setting has been performed. The controller 100 may control the UI generator 150 to display a UI which is used to select the control setting. The controller 100 may check whether an HDMI connection port has been changed, and if so, may change an HDMI connection port setting and receive the ID information through the changed HDMI connection port.

Figure 3:
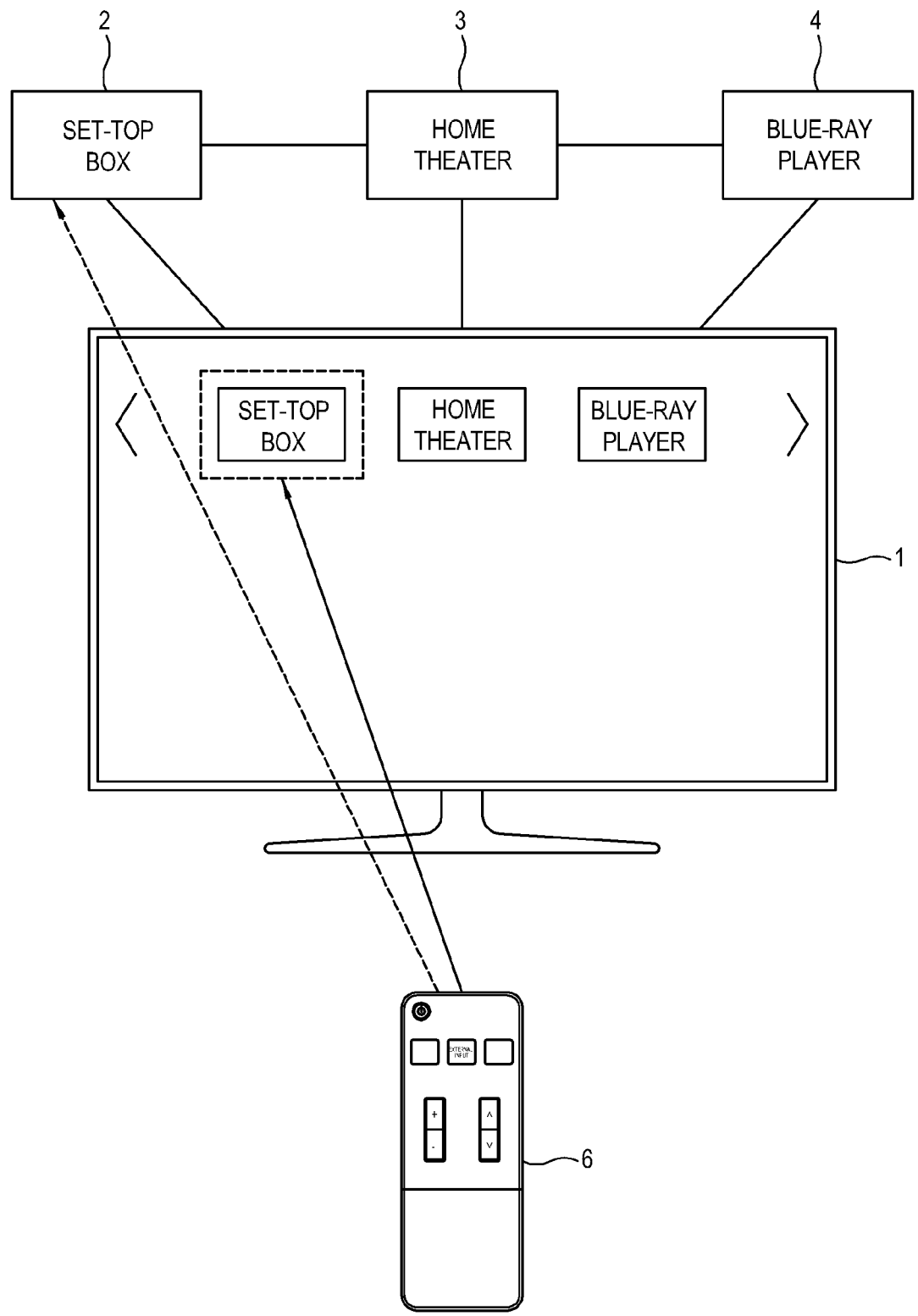
FIG. 3 illustrates an example of a display device which is set with respect to a remote controller and controlled by peripheral electronic devices according to an exemplary embodiment.

FIG. 3 illustrates an example of the display device 1 which is set with respect to a remote controller 6 and is controlled by peripheral electronic devices 2 to 4 according to an exemplary embodiment.

The display device 1 according to the exemplary embodiment as shown in FIG. 3 is connected to a set-top box 2 to receive broadcasting signals and satellite signals, a home theater 3 to reproduce movies, and a blue-ray player 4 to reproduce higher quality images. When the connected three electronic devices 2 to 4, i.e., the set-top box 2, the home theater 3, and the blue-ray player 4 are turned on, the display device 1 may check whether a remote controller setting has been performed with respect to the three electronic devices 2 to 4. When it is checked that, for example, no remote controller setting has been performed for the set-top box 2, a UI may be displayed to inquire of the user whether to set the remote controller 6 for the set-top box 2. If the user selects to set the remote controller 6 for the set-top box 2, the display device 1 checks whether the set-top box 2 has a control key, and if so, may receive the control key therefrom and transmit the control key to the remote controller 6. Thus, the user may control the peripheral electronic devices 2 to 4 of the display device 1 by using the single remote controller 6. As shown in FIG. 3, when the display device 1 sets the set-top box 2 through an external input key of the remote controller 6, the user may control the set-top box 2 with the corresponding remote controller 6. In the related art, the user needs to check whether a remote controller selected by the user is a remote controller of the set-top box 2 and set the remote controller of the set-top box 2. However, in the display device 1 according to the exemplary embodiment, the user may simply check a newly connected electronic device and set remote control of the electronic device with the single remote controller 6. Therefore, the user may control the peripheral electronic devices 2 to 4 with the single remote controller 6, without the aforementioned complicated processes in the related art.

Figure 4:
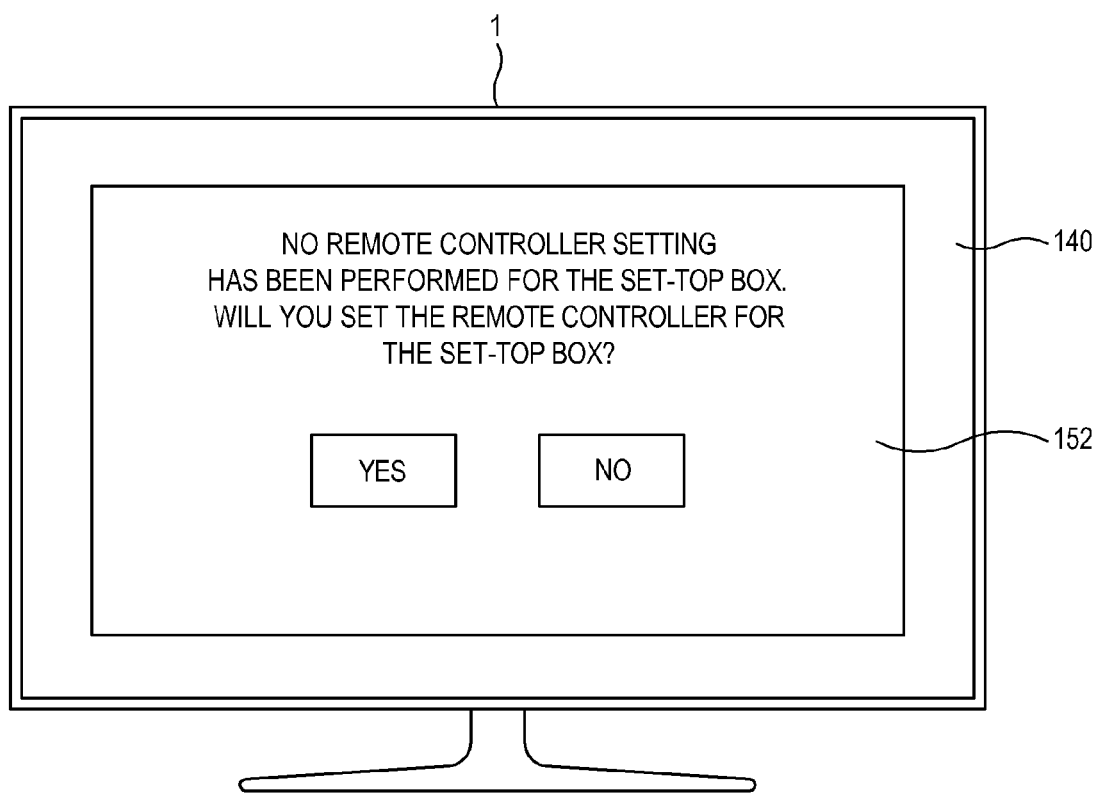
FIG. 4 illustrates an example of a user interface (UI) for setting a remote controller in a display device according to an exemplary embodiment.

FIG. 4 illustrates an example of a UI 152 for setting the remote controller 6 in the display device 1 according to an exemplary embodiment.

In the UI 152, an inquiry of whether the user desires to set the remote controller for the set-top box 2 is displayed on the display device 1. When the user select a "YES" button from "YES" and "NO" buttons in the UI 152, setting of the remote controller 6 is performed. Specifically, the display device 1 may search for the set-top box 2 and automatically set a control key corresponding to the set-top box 2 instead of a user's searching for and setting the remote controller 6 for the set-top box 2. As shown in FIG. 3, the user may perform control setting of the remote controller 6 with a knowledge that the setting of the remote controller 6 has not been performed for the set-top box 2.

Figure 5:
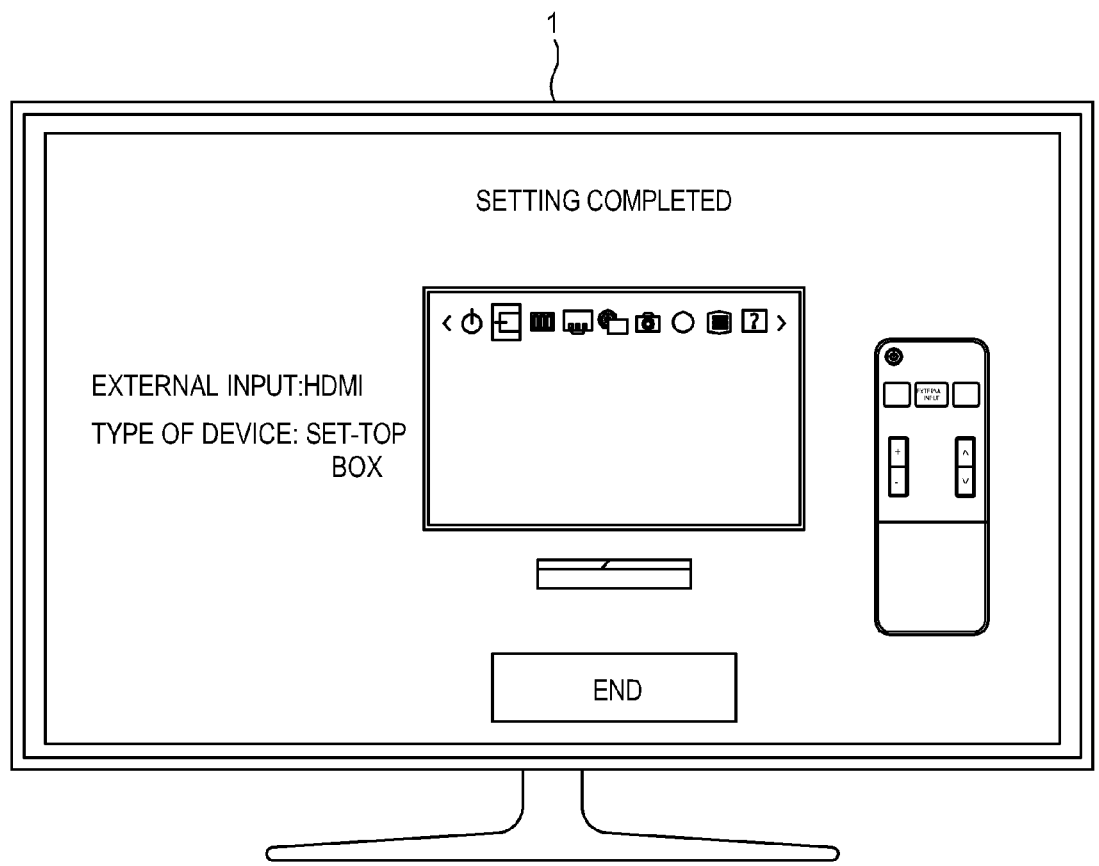
FIG. 5 illustrates an example of a screen showing a completion of setting of a remote controller in a display device according to an exemplary embodiment.

FIG. 5 illustrates an example of a screen showing a completion of setting of the remote controller 6 in the display device 1 according to an exemplary embodiment.

When the user pushes the "YES" button in FIG. 4 and the remote control setting is completed for the set-top box 2, "external input: HDMI" and "type of device: set-top box 2" are displayed as shown in FIG. 5. The user may move, select and control the peripheral electronic devices 2 to 4 through, for example, direction keys (or arrow keys) of the remote controller 6.

Figure 6:
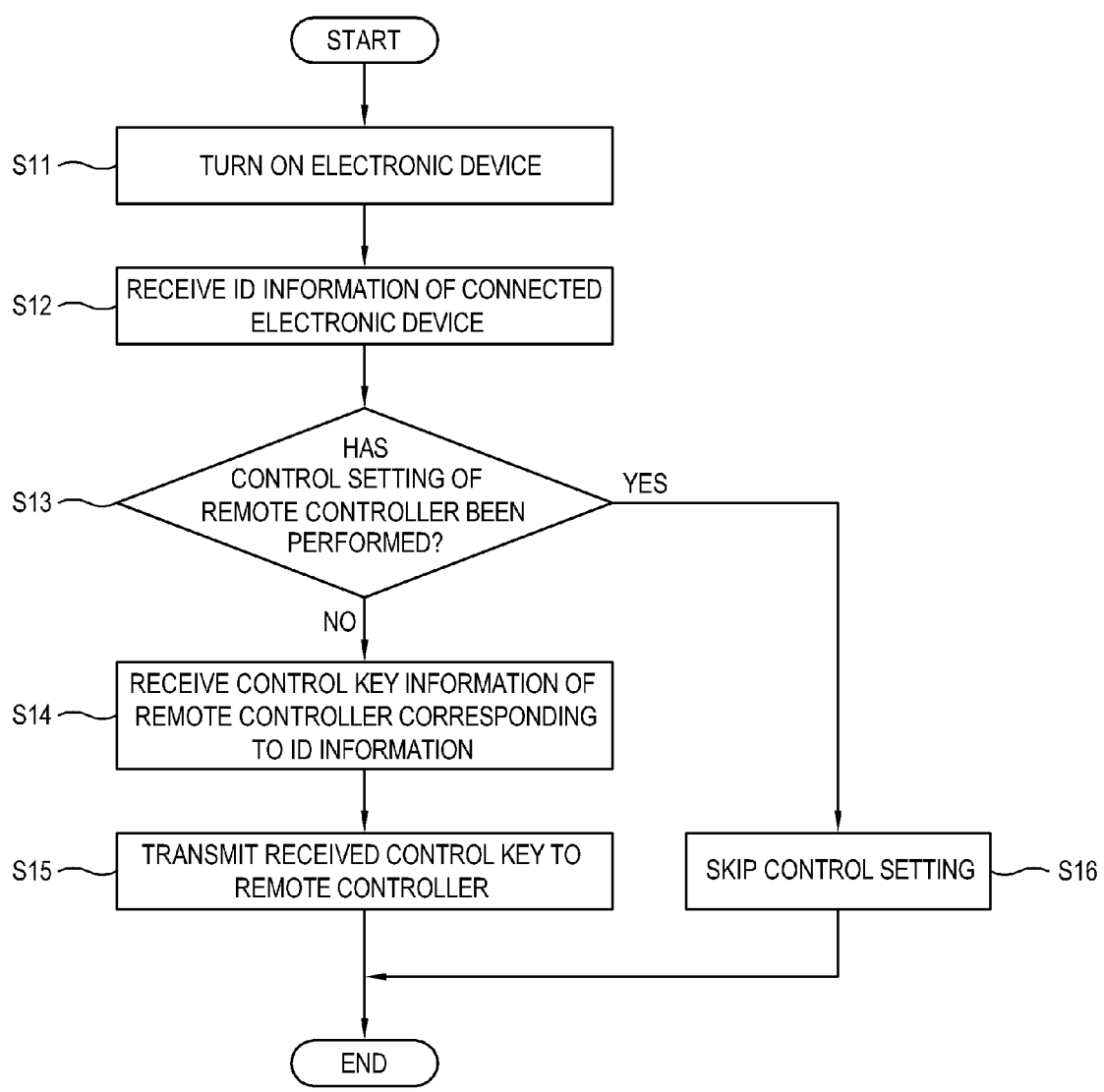
FIG. 6 is a control flowchart showing operations of a display device according to an exemplary embodiment.

FIG. 6 is a control flowchart showing operations of the display device 1 according to an exemplary embodiment.

In FIG. 6, it is assumed that the display device 1 is connected to the plurality of electronic devices 2 to 4. The peripheral electronic devices 2 to 4 are turned on by a user or through other means (S11). Next, the controller 100 receives the ID information of at least one of the connected electronic devices 2 to 4 from the plurality of electronic devices 2 to 4 (S12). The controller 100 checks whether the control setting of the remote controller 6 has already been performed for the plurality of electronic devices 2 to 4 (S13). If the control setting of the remote controller 6 has been performed for the electronic devices 2 to 4, a control setting process is skipped (S16). The display device 1 receives a control key of the remote controller 6 corresponding to the ID information of the electronic devices 2 to 4 for which no control setting of the remote controller 6 has been performed (S14). The controller 100 transmits the control key to the remote controller 6 (S15). Thus, the single remote controller 6 may control the plurality of electronic devices 2 to 4.

Figure 7:
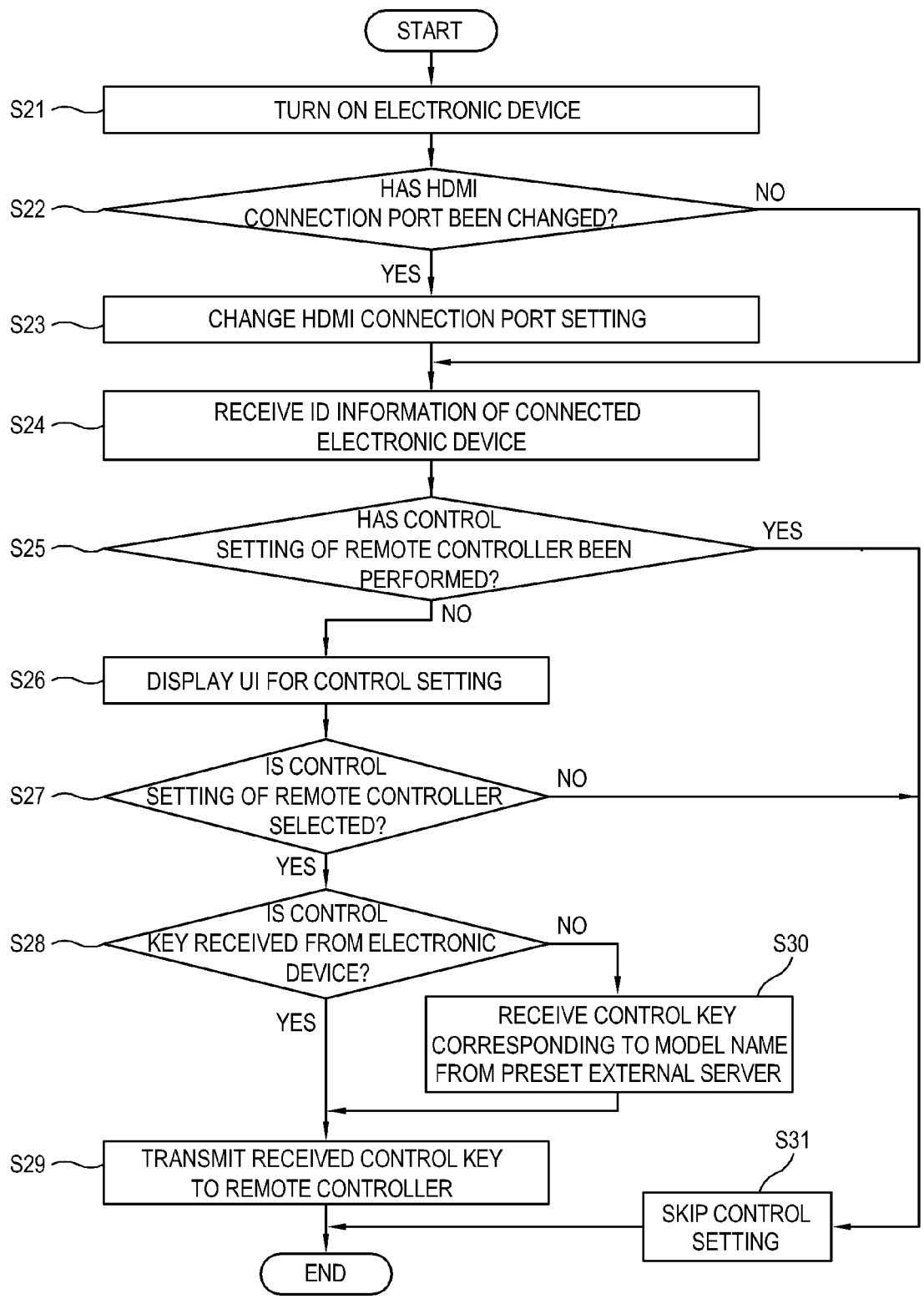
FIG. 7 is a control flowchart showing operations of a display device according to another exemplary embodiment.

FIG. 7 is a control flowchart showing operations of the display device 1 according to another exemplary embodiment.

The display device 1 is connected to the plurality of electronic devices 2 to 4, and the peripheral electronic devices 2 to 4 are turned on by a user or through other means (S21). The controller 100 checks whether the HDMI connection port has been changed (S22). If yes, the controller 100 changes the HDMI connection port setting (S23). Next, the controller 100 receives ID information such as information on the manufacturer and the model name of the connected electronic devices 2 to 4 from the plurality of electronic devices 2 to 4 (S24). If no HDMI connection port has been changed, operation S23 is skipped and operation S24 is performed. The controller 100 checks the received ID information on the manufacturer and the model name and checks whether the control setting of the remote controller 6 has been performed (S25). If the control setting of the remote controller 6 has been performed ("yes" to operation S25), the control setting process is skipped (S31). If the control setting of the remote controller 6 has not been performed ("no" to operation S25), a UI is displayed to perform the control setting of the remote controller 6 (S26). Next, the controller 100 checks whether to perform the control setting (S27). If no control setting is to be performed, the control setting is skipped (S31) and the control setting process is terminated. If the control setting of the remote controller 6 is to be performed, the controller 100 checks whether the control key is received from the connected electronic devices 2 to 4 (S28). If the electronic devices 2 to 4 have the control key, the controller 100 receives the control key from the electronic devices 2 to 4 and transmits the control key to the remote controller 6 (S29). If the electronic devices 2 to 4 have no control key, the controller 100 requests an external server to transmit a control key corresponding to the model name of the connected electronic devices 2 to 4, and transmits the received control key to the remote controller 6 (S30).

The display device 1 may receive the ID information of the peripheral electronic devices 2 to 4 connected thereto, may receive the control key of the remote controller 6 from at least one of the electronic devices 2 to 4 for which no control setting of the remote controller 6 has been performed, and transmit the control key to the remote controller 6 to automatically set the control key corresponding to the ID information. Thus, complicated processes may be avoided and the control setting may be performed without much difficulty.

Figure 8:
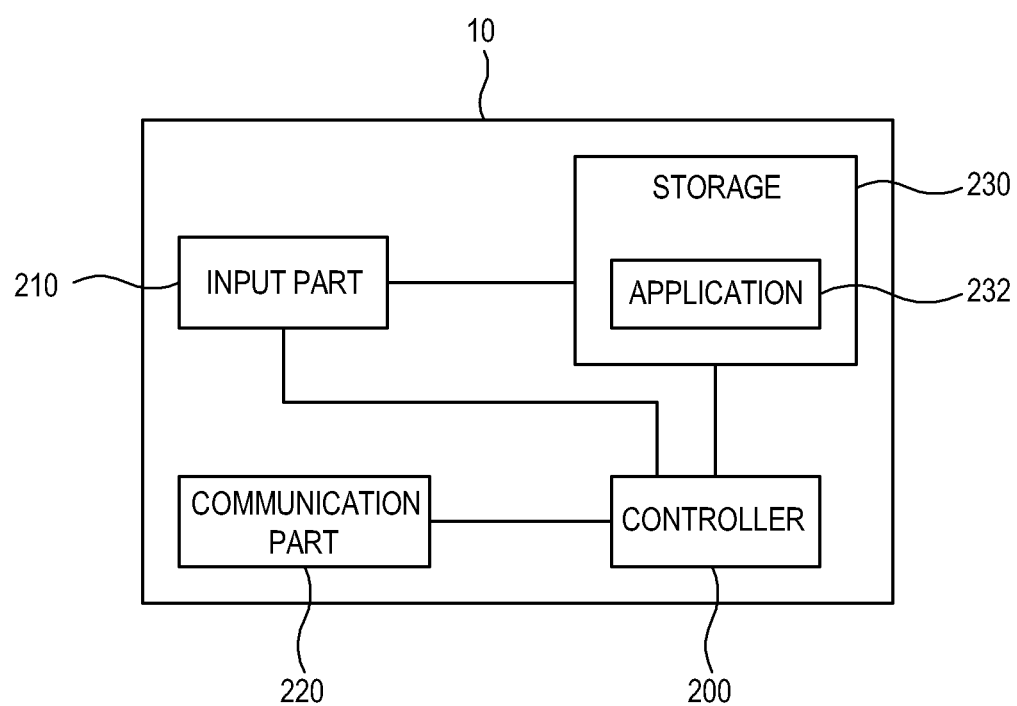
FIG. 8 is a block diagram of a user terminal apparatus according to an exemplary embodiment.

FIG. 8 is a block diagram of a user terminal apparatus 10 according to an exemplary embodiment. As shown in FIG. 8, the user terminal apparatus 10 according to an exemplary embodiment may include an input part 210, a communication part 220, a storage 230 and a controller 200. The user terminal apparatus 10 may be implemented as, for example, a smart phone, a tablet PC, or a laptop computer.

The input part 210 may be used to input the ID information of electronic devices 2 to 4 including at least one of an image and an audio related to the electronic devices 2 to 4. The user terminal apparatus 10 may include the input part 210 provided in a display unit (not shown) such as a touch screen. The input part 210 may be provided for a user to input the model name or the manufacturer of the electronic devices 2 to 4. The input part 210 may receive and transmit the image and the audio related to the electronic devices 2 to from and to the outside to the controller 200. The input part 210 may be separate from the display unit and may receive a user's input.

The communication part 220 receives an external input signal and transmits the external input signal to an image processor (not shown) through the controller 200. The communication part 220 is connected to various types of external input cables and may receive the external input signal in a wired manner or a wireless manner according to a predetermined wireless communication specification.

The communication part 220 may include a plurality of connectors (not shown) to which cables are respectively connected. The communication part 220 may receive signals from connected external inputs, e.g., broadcasting signals, image signals and data signals according to HDMI, USB, or component, or receive communication data through a communication network.

In addition to the above elements for receiving signals and/or data from the external inputs, the communication part 220 may further include various elements such as a wireless communication module (not shown) for wireless communication or a tuner (not shown) for turning broadcasting signals depending on a design type of the user terminal apparatus 10. The communication part 220 may transmit information including as data and/or signals of the display device 1 to an external device as well as receiving signals from the external device. That is, the communication part 220 is not limited to receiving signals from the external device and may be implemented as an interface for interactive communication. The communication part 220 may receive a control signal from a plurality of control devices to select a UI. The communication part 220 may include a communication module for wireless local area communication such as Bluetooth, Infrared (IR), Ultra Wideband (UWB), or Zigbee, or include a communication port for wired communication. The communication part 220 may be used for various purposes including transmission and reception of data and commands for manipulating displays as well as receiving control signals for selecting a UI.

The storage 230 may include a writable ROM in which data remain even when power is cut off from the display device 10, and any change may be reflected in respect of a user. That is, the storage 230 may be implemented as, for example, a flash memory, an EPROM or an EEPROM. The storage 230 may store therein an application 232 to remotely control the electronic devices 2 to 4.

The controller 200 may control overall internal elements of the user terminal apparatus 10. The controller 200 may receive a control key corresponding to the electronic devices 2 to 4 based on input ID information and control the application 232 to remotely control the electronic devices 2 to 4 with the received control key.

Figure 9:
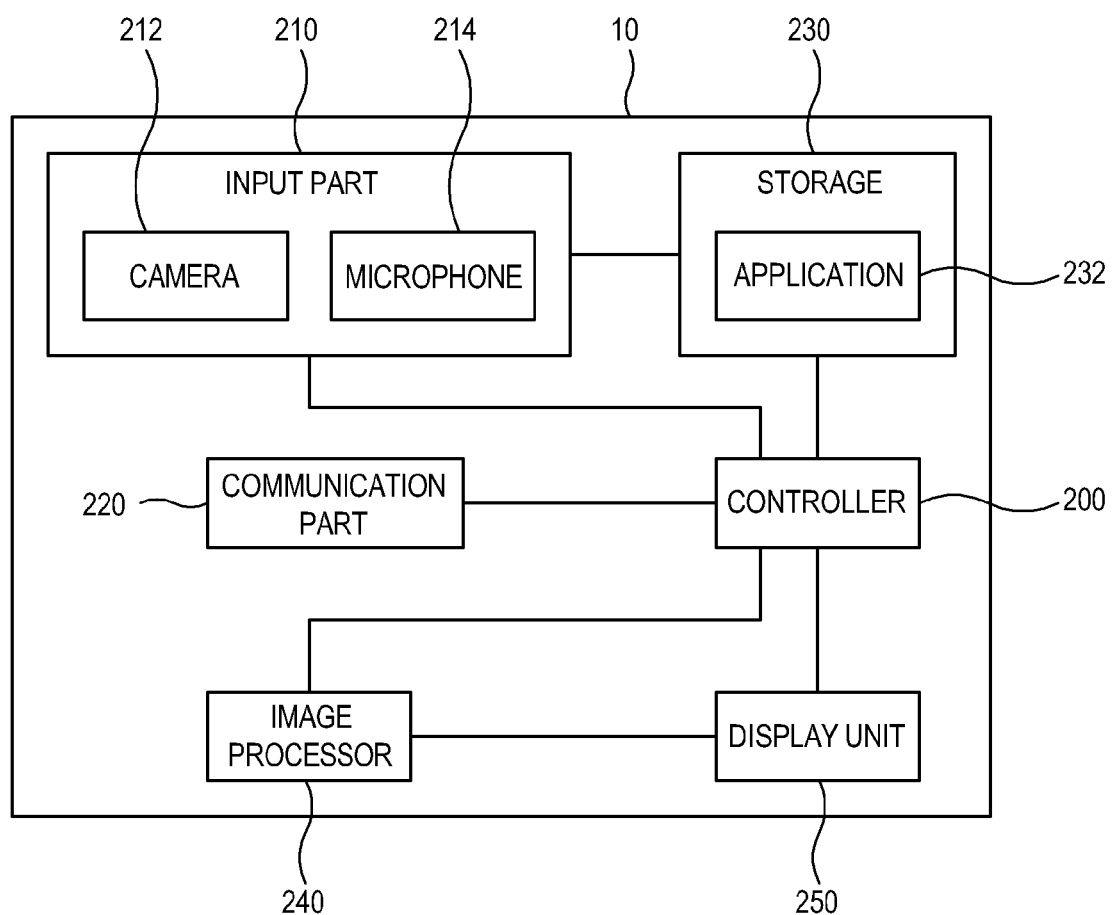
FIG. 9 is a block diagram of a user terminal apparatus according to another exemplary embodiment.
Figure 10:
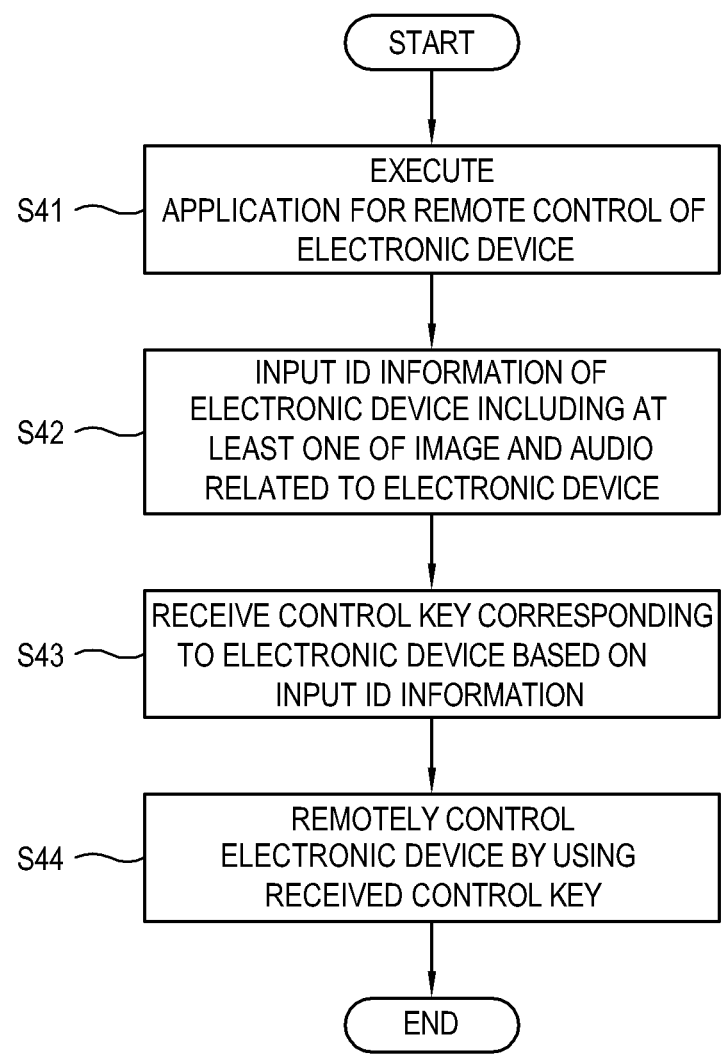
FIG. 10 is a control flowchart showing operations of a user terminal apparatus according to an exemplary embodiment.

FIG. 9 is a block diagram of the user terminal apparatus 10 according to another exemplary embodiment. As shown in FIG. 10, the user terminal apparatus 10 according to another exemplary embodiment may further include an image processor 240 and a display unit 250 as well as the input part 210, the communication part 220, the storage 230 and the controller 200 in FIG. 8.

The input part 210 may include a camera 212 which captures an image and a microphone 214 which receives audio.

The image processing operation of the image processor 240 may include a decoding operation corresponding to an image format of image data, a de-interlacing operation for converting interlace image data into progressive image data, a scaling operation for adjusting image data into a preset resolution, a noise reduction operation for improving a quality of an image, a detail enhancement operation, a frame refresh rate conversion, etc.

The image processor 240 may be implemented as a system-on-chip (SoC) which integrates the aforementioned functions or may be implemented as an image processing board (not shown) which is provided by installing elements for performing the aforementioned processes in a printed circuit board (PCB). The image processor 240 may be installed in the display device 10.

The image processor 240 processes image signals received through the communication part 120, broadcasting signal including image signals stored in the storage 230, and source images including image signals supplied by an image supply source (not shown). The image processor 240 outputs the processed image signal to the display device 10, in which the processed source image may be displayed.

The display unit 250 may display an image thereon based on an image signal output from the image processor 240. The display unit 250 may be implemented as various displays such as an LCD, a PDP, an LED, an OLED, a surface-conduction electron-emitter, a carbon nano-tube, a nano-crystal, etc., but not limited thereto.

The display unit 250 may further include additional elements depending on its embodiment type. For example, the display unit 140 implemented as an LCD may include an LCD panel (not shown), a backlight unit (not shown) which emits light to the LCD panel, and a panel driving substrate (not shown) which drives the LCD panel.

The display unit 250 displays an image thereon based on the image signal processed by the image processor 240. The display unit 250 may include an LCD, a PDP or an OLED but not limited thereto. Also, the display unit 250 may include an LCD panel, a PDP panel or an OLED panel.

The controller 200 may analyze the image captured by the camera 212 of the input part 210 and the audio input to the microphone 214 to determine the ID information of the electronic devices 2 to 4. The image captured by the camera 212 may include the model name of the electronic devices 2 to 4. For example, the captured image may be related to a specification including a bar code and a quick response (QR) code of the electronic devices 2 to 4. The audio input to the microphone 214 may be the model name of the electronic devices 2 to 4 spoken by a user. That is, when the user may speak the model name, a user's voice may be input. The controller 200 may convert the model name of the image into a text and use the text as the ID information of the electronic devices 2 to 4. Alternatively, the controller 200 may convert the model name input as the audio into a text and use the text as the ID information of the electronic devices 2 to 4.

The controller 200 may display an image of the ID information of the electronic devices 2 to 4. Also, the controller 200 may store the user's voice as an audio command to use the stored audio command to control the electronic devices 2 to 4. The controller 200 may change the image of the ID information of the electronic devices 2 to 4 or the stored audio command. For example, the image of the electronic devices 2 to 4 displayed in the user terminal apparatus 10 may be replaced by a desired image to be stored. If the stored desired image is selected, the electronic devices 2 to 4 may be controlled. In the case of the audio command, the audio command, for example, "cooler, reduce temperature!" may be changed to and stored as an audio command of "cooler" to control an air conditioner.

The controller 200 may check the electronic devices 2 to 4 which may be wirelessly connected to the user terminal apparatus 10 and the display device 10. If the application 232 for remote control of the user terminal apparatus 10 is executed, peripheral connection status and controllable electronic devices 2 to 4 may be checked. Also, remote control setting of the electronic devices 2 to 4 may be checked.

The controller 200 may set a connection port of the electronic devices 2 to 4 and the display device 10. For example, when the user terminal apparatus 10 is carried by a user who is away from home and the user desires to maintain the home cool, the user may transmit a control command to the display device 10 and operate an electronic device, i.e., an air conditioner by using wireless connection setting of the display device 10 and the air conditioner.

The controller 200 may receive a control key from at least one of the electronic devices 2 to 4, the display device 10, and an external server. The controller 200 may analyze ID information of the electronic devices 2 to 4 through the image of the electronic devices 2 to 4, and receive a control key from the concerned electronic devices 2 to 4 to remotely control the electronic devices 2 to 4. If the user terminal apparatus 10 is in a different location from the electronic devices 2 to 4, the controller 200 may receive a control key from the external server to remotely control the electronic devices 2 to 4 or receive a control key stored in the display device 10.

The controller 200 may be connected to the external server, log in the server with a user account, and transmit to the external server remote control setting information to upload setting information to the user account. The setting information may include a control key corresponding to the electronic devices 2 to 4.

FIG. 10 is a control flowchart showing operations of the user terminal apparatus 10 according to an exemplary embodiment.

If a user selects the application 232 to remotely control the electronic devices 2 to 4, the controller 200 executes the application 232 stored in the storage 230 to remotely control the electronic devices 2 to 4 (S41). The ID information of the electronic devices 2 to 4 including at least one of an image and an audio related to the electronic devices 2 to 4 is input (S42). The controller 100 receives the control key corresponding to the electronic devices 2 to 4 based on the input ID information (S43). The electronic devices 2 to 4 are remotely controlled by the received control key (S44).

Figure 11:
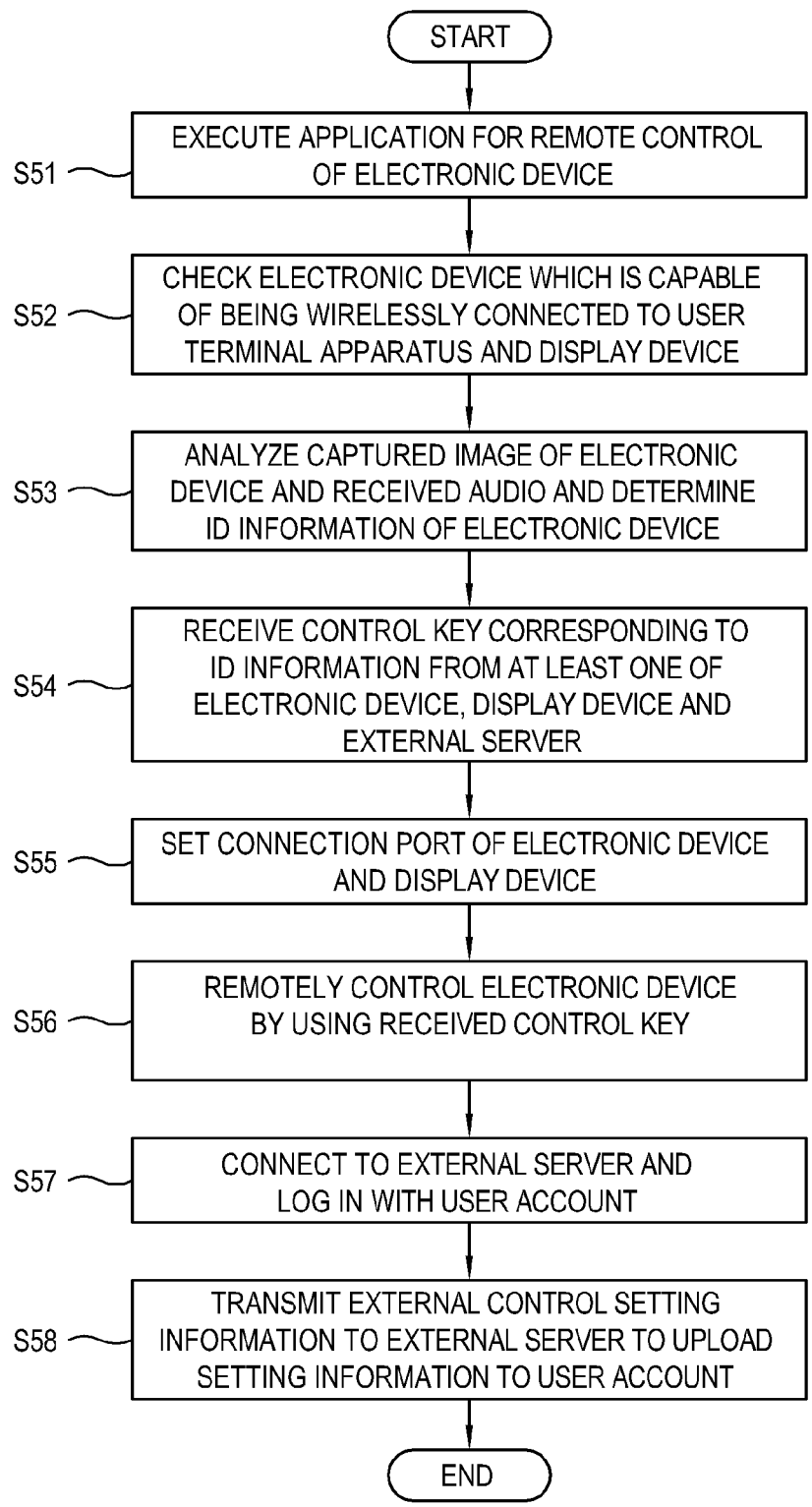
FIG. 11 is a control flowchart showing operations of a user terminal apparatus according to another exemplary embodiment.

FIG. 11 is a control flowchart showing operations of the user terminal apparatus 10 according to another exemplary embodiment.

When a user selects the application 232 to remotely control the electronic devices 2 to 4, the controller 200 executes the application 232 stored in the storage 230 to remotely control the electronic devices 2 to 4 (S51). The controller 200 checks the electronic devices 2 to 4 which may be wirelessly connected to the user terminal apparatus 10 and the display device 10 (S52). The remote control setting of the checked electronic devices 2 to 4 may also be displayed. The controller 200 analyzes the captured image and the received audio related to the electronic devices 2 to 4 to determine the ID information of the electronic devices 2 to 4 (S53). The controller 200 may analyze the image including a model name captured by the camera 212 and the audio including the model name to identify the electronic devices 2 to 4 for which the remote control is set. The controller 200 receives the control key corresponding to the ID information from at least one of the electronic devices 2 to 4, the display device 10, and the external server (S54). The connection port of the electronic devices 2 to 4 and the display device 20 is set (S55). This is performed to remotely control the electronic devices 2 to 4, by the user terminal apparatus 10 remotely located therefrom, e.g., outside home. The remote control of the electronic devices 2 to 4 is performed by using the received control key (S56). The controller 200 is connected to the external server and logs in the external server with the user account (S57). The remote control setting information is transmitted to the external server to be uploaded to the user account (S58).

Figure 12:
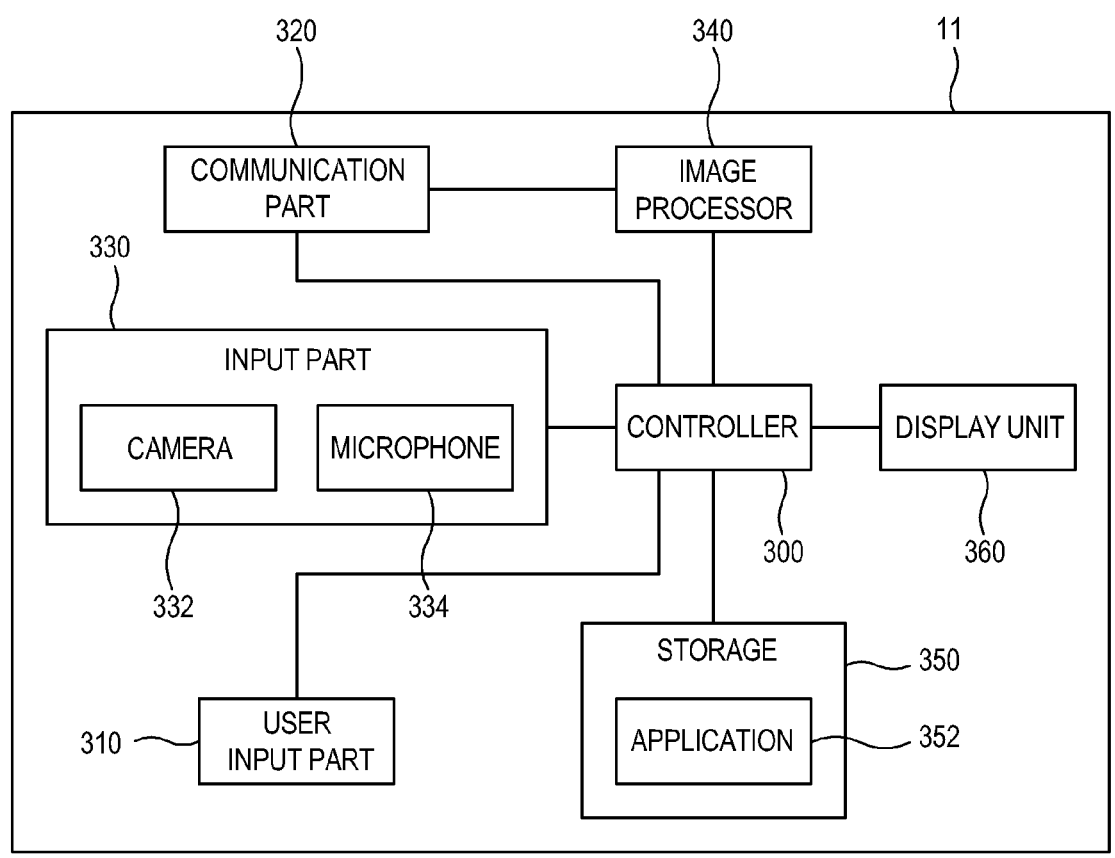
FIG. 12 is a block diagram of a user terminal apparatus which is capable of logging in an external server and sharing remote control setting information according to an exemplary embodiment.

FIG. 12 is a block diagram of a user terminal apparatus 11 for logging in an external server with a user account and sharing remote control setting information according to another exemplary embodiment. As shown in FIG. 12, the user terminal apparatus 11 may include a communication part 320, a user input part 310, and a controller 300. The user terminal apparatus 11 may further include an input part 330, an image processor 340, a display unit 360, and a storage 350 as in FIG. 9. The communication part 320, the input part 330, the image processor 340, the display unit 360 and the storage 350 are the same as those in FIG. 9, and the description thereof will be omitted.

The user input part 310 transmits various control commands or information to the controller 300 according to a user's manipulation and input. The user input part 310 may be implemented as a menu key or input panel installed in an external part of the display device 10, or as a remote controller 6 which is separate and spaced apart from the display device 10. Alternatively, the user input part 310 may be integrally formed in the display unit 360. When the display unit 360 is a touch screen, a user may touch an input menu (not shown) on the display unit 360 to transmit a preset command to the controller 300.

The user input part 310 may receive a user's motion. The user's motion may include a touch input. The user input part 310 may directly receive the user's motion or receive information of the user's motion from an external device.

The controller 300 may be connected to the external server, log in the external server with a user account, and control the communication part 320 to receive remote control setting information of the electronic devices 2 to 4 which has been uploaded to the user account and to remotely control the electronic devices 2 to 4 by using the received setting information.

Figure 13:
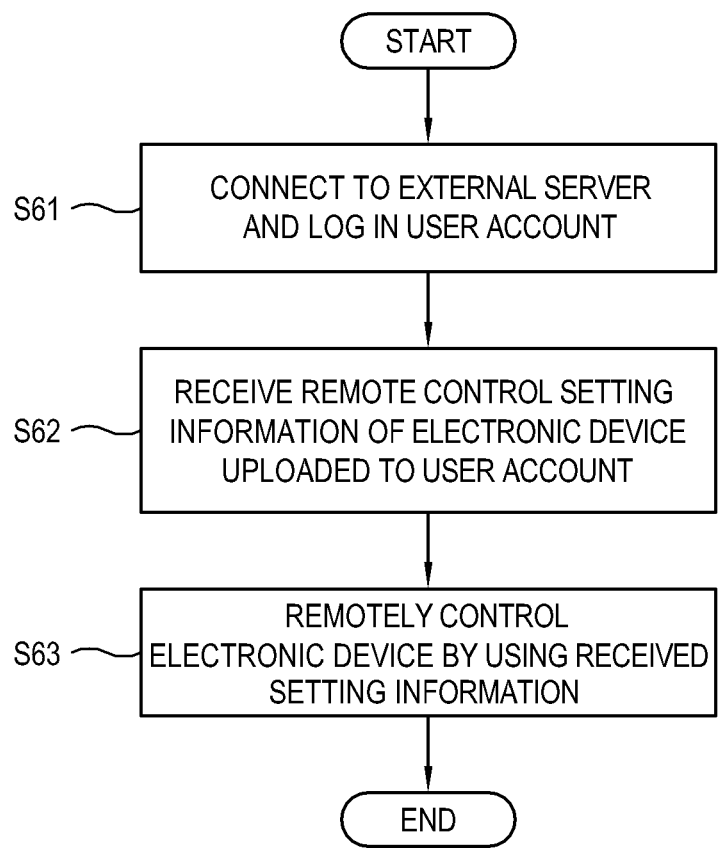
FIG. 13 is a control flowchart showing operations of a user terminal apparatus which is capable of logging in an external server and sharing remote control setting information according to an exemplary embodiment.

FIG. 13 is a control flowchart showing operations of logging in an external server with the user terminal apparatus 11 and sharing remote control setting information by the user terminal apparatus 11 according to an exemplary embodiment.

The user terminal apparatus 11 is connected to the external server and logs in the external server with the user account (S61). The user terminal apparatus 11 receives the setting information for remote control of the electronic devices 2 to 4 which has been uploaded to the user account (S62). The user terminal apparatus 11 remotely controls the electronic devices 2 to 4 by using the received setting information (S63).

Figure 14:
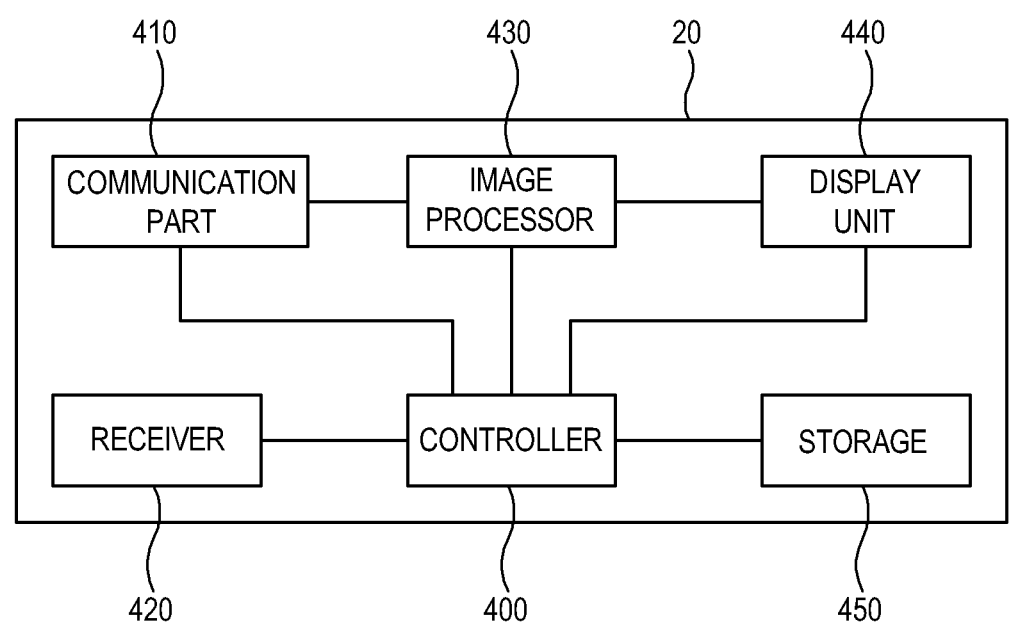
FIG. 14 is a block diagram of a display device which logs in an external server and transmits remote control setting information according to an exemplary embodiment.

FIG. 14 is a block diagram of a display device 20 which logs in an external server with a user account and transmits remote control setting information according to an exemplary embodiment. As shown in FIG. 14, the display device 20 may include a communication part 410, a receiver 420, an image processor 430, a display unit 440, a storage 450 and a controller 400.

The receiver 420 transmits various preset control commands or information to the controller 400 according to a user's manipulation and input. The receiver 420 may be implemented as a menu key or input panel installed in an external part of the display device 20 or as a remote controller 6 which is separate and spaced apart from the display device 20. Alternatively, the receiver 420 may be integrally formed in the display unit 440. When the display unit 440 is a touch screen, a user may touch an input menu (not shown) on the display unit 440 to transmit a preset command to the controller 400.

The communication part 410 receives an external input signal and transmits the external input signal to the image processor 430. The communication part 410 is connected to various types of external input cables and may receive the external input signal in a wired manner or receive a signal in a wireless manner according to a predetermined wireless communication specification.

The communication part 410 may include a plurality of connectors (not shown) to which respective cables are connected. The communication part 410 may receive signals from the connected external inputs, e.g., broadcasting signals, image signals and data signals according to HDMI, USB or Component or receive communication data through a communication network.

In addition to the elements for receiving signals and/or data from external inputs, the communication part 410 may further include various elements such as a wireless communication module (not shown) for wireless communication or a tuner (not shown) for turning broadcasting signals depending on a design type of the display device 20. The communication part 410 may transmit information including data and/or signals of the display device 20 to an external device as well as receiving signals from the external device. That is, the communication part 410 is not limited to receiving signals from an external device and may be implemented as an interface for interactive communication. The communication part 410 may receive a control signal from a plurality of control devices to select a UI. The communication part 410 may include a communication module for wireless local area communication such as Bluetooth, Infrared (IR), Ultra Wideband (UWB), or Zigbee or include a communication port for wired communication. The communication part 410 may be used for various purposes including transmission and reception of data and commands for manipulating displays as well as receiving control signals for selecting a UI.

The storage 450 may include a writable ROM in which data remain even when power is cut off from the display device 20 and any change may be reflected in respect of a user. That is, the storage 450 may be implemented as, for example, a flash memory, an EPROM, or an EEPROM. The storage 450 may store therein an application for remote control of electronic devices.

The image processing operation of the image processor 430 may include a decoding operation corresponding to an image format of image data, a de-interlacing operation for converting interlace image data into progressive image data, a scaling operation for adjusting image data into a preset resolution, a noise reduction operation for improving a quality of an image, a detail enhancement operation, a frame refresh rate conversion, etc.

The image processor 430 may be implemented as a system-on-chip (SoC) which integrates the aforementioned functions or may be implemented as an image processing board (not shown) which is provided by installing elements for performing the aforementioned processes in a printed circuit board (PCB). The image processor 430 may be installed in the display device 20.

The image processor 430 processes image signals received through the communication part 410, broadcasting signal including image signals stored in the storage 450, and source images including image signals supplied by an image supply source (not shown). The image processor 430 outputs the processed image signal to the display device 20, on which the processed source image may be displayed.

The display unit 440 may display an image thereon based on the processed image signal output from the image processor 430. The display unit 440 may be implemented as various displays such as an LCD, a PDP, an LED, an OLED, a surface-conduction electron-emitter, a carbon nano-tube, a nano-crystal, etc., but not limited thereto.

The display unit 440 may further include additional elements depending on an embodiment type thereof. For example, the display unit 440 as an LCD may include an LCD panel (not shown), a backlight unit (not shown) which emits light to the LCD panel, and a panel driving substrate (not shown) which drives the LCD panel.

The display unit 440 displays an image thereon based on the image signal processed by the image processor 430. The display unit 440 may include an LCD, a PDP or an OLED but not limited thereto. The display unit 440 may also include an LCD panel, PDP panel or OLED panel.

The controller 400 may control the communication part 410 to receive remote control setting information corresponding to the electronic devices connected to the display device 20, to transmit the received setting information to the remote controller 6. Also, the controller 400 may control the communication part 410 to log in to the external server with the user account and to transmit the setting information to the external server to upload the setting information to the user account.

Figure 15:
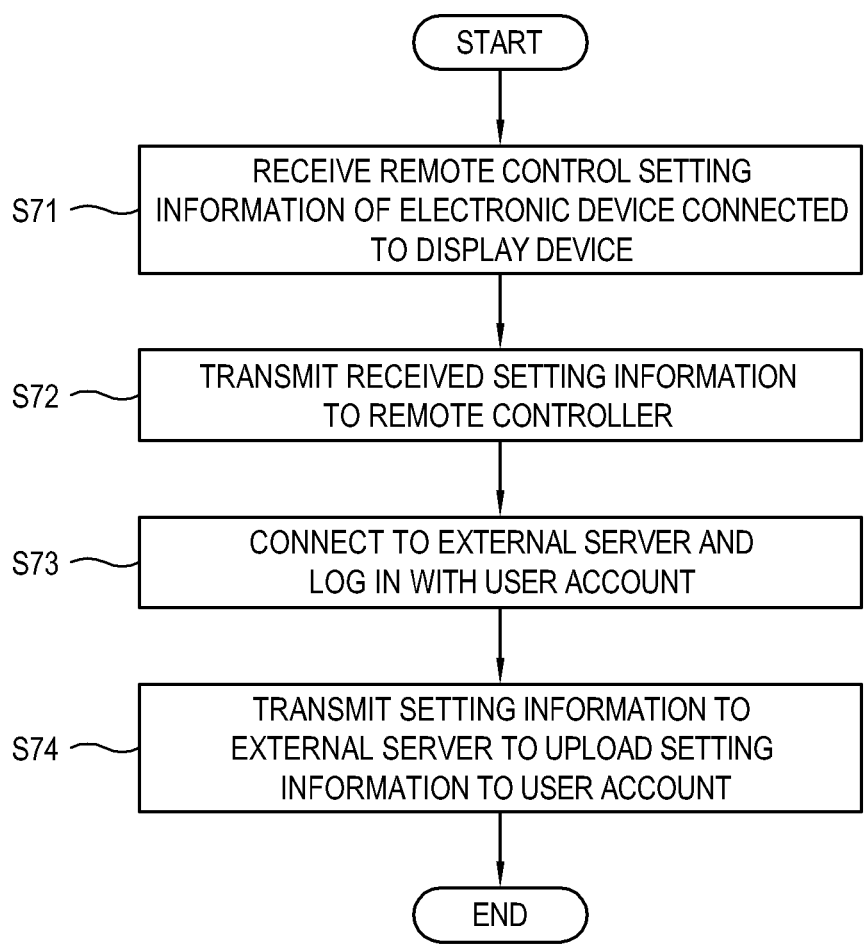
FIG. 15 is a control flowchart showing operations of a display device which logs in to an external server and transmits remote control setting information according to an exemplary embodiment.

FIG. 15 is a control flowchart showing operations of logging in an external server with a user account and transmitting remote control setting information by the display device 20 according to an exemplary embodiment.

The display device 20 receives the remote control setting information corresponding to the electronic devices 2 to 4 connected to the display device 20 (S71). The display device 20 transmits the received setting information to the remote controller 6 (S72). The display device 20 is connected to the external server and logs in to the external server with the user account (S73). The display device 20 transmits the setting information to the external server to upload the setting information to the user account (S74).

Figure 16:
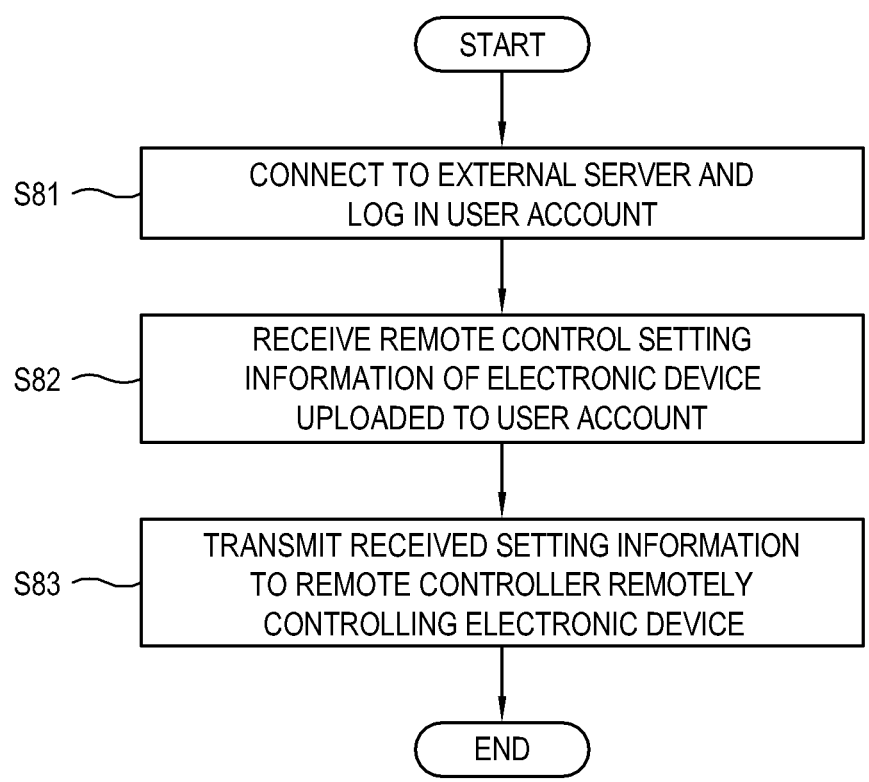
FIG. 16 is a control flowchart showing operations of a display device which logs in an external server and receives remote control setting information according to an exemplary embodiment.

FIG. 16 is a control flowchart showing operations of logging in an external server with a user account and receiving remote control setting information by the display device 20 according to an exemplary embodiment.

The display device 20 is connected to the external server and logs in the user account (S81). The display device 20 receives remote control setting information which has been uploaded to the user account (S82). The display device 20 transmits the received setting information to the remote controller 6 which remotely controls the electronic devices 2 to 4 (S83).

Figure 17:
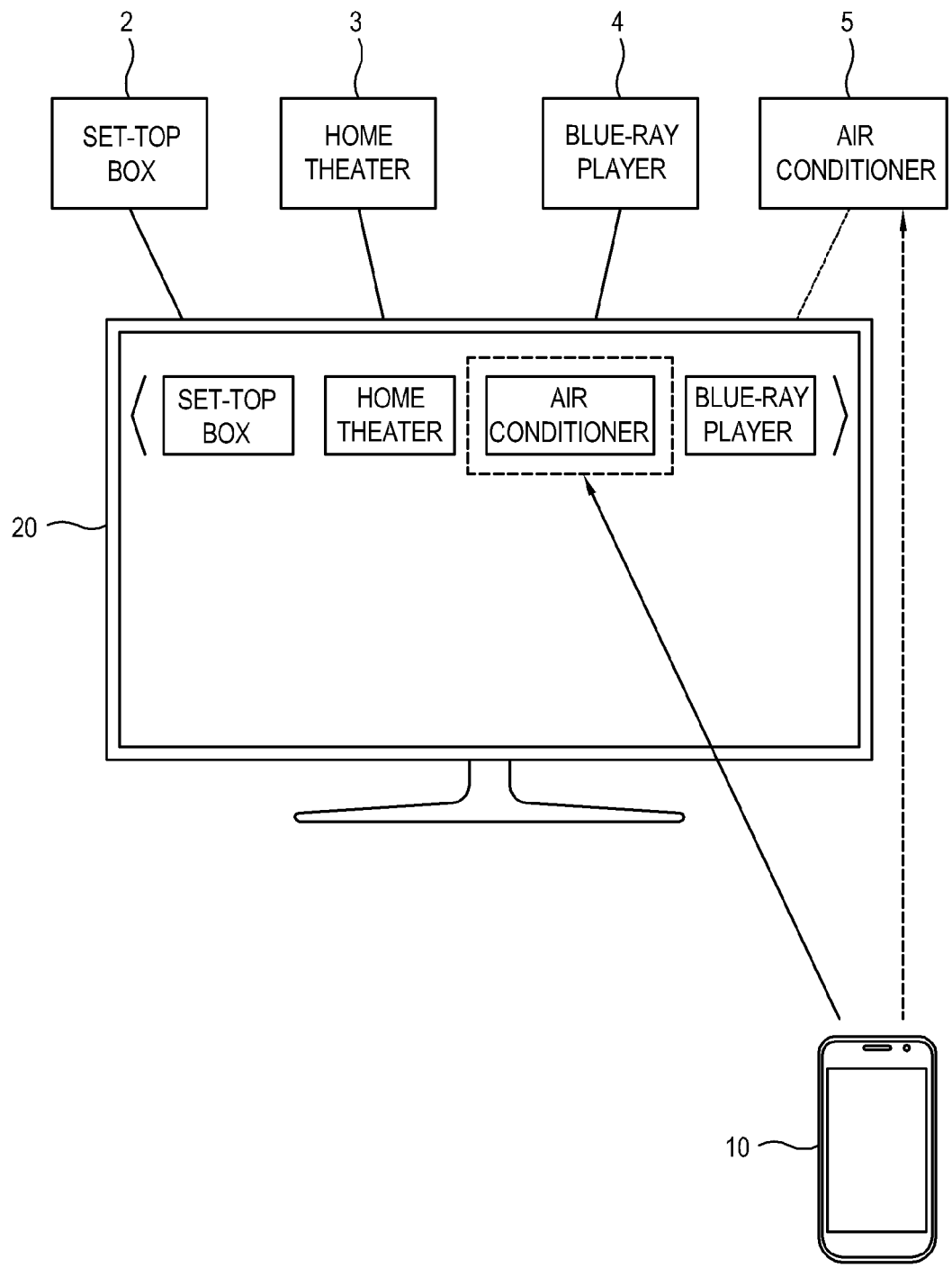
FIG. 17 illustrates an example of setting a remote control of an electronic device by a user terminal apparatus according to an exemplary embodiment.

FIG. 17 illustrates an example of setting a remote control of electronic devices 2 to 5 by the user terminal apparatus 10 according to an exemplary embodiment.

As shown in FIG. 17, display device 20 is connected to the set-top box 2, the home theater 3 and the blue-ray player 4 in a wired manner through HDMI, and an air conditioner is connected in a wireless manner through Bluetooth. The application 232 for remote control of electronic devices 2 to 5 is executed to remotely control an air conditioner 5 by using the user terminal apparatus 10. The controller 200 of the user terminal apparatus 10 checks whether the air conditioner 5 is wirelessly connectable and captures an image of a specification including a bar code and a QR code of the air conditioner 5. The user terminal apparatus 10 sequentially checks whether a control key is received from at least one of the air conditioner 5, the display device 20 and the external server. The controller 200 sets a wireless connection port of the display device 20 and the air conditioner 5. Thus, the user terminal apparatus 10 may easily perform the remote control setting to remotely control the air conditioner 5.

Similarly to the display device 20, the user terminal apparatus 10 may also display remotely controllable electronic devices 2 to 5 on the display unit 250 and may select and remotely control any desired electronic devices 2 to 5.

Figure 18:
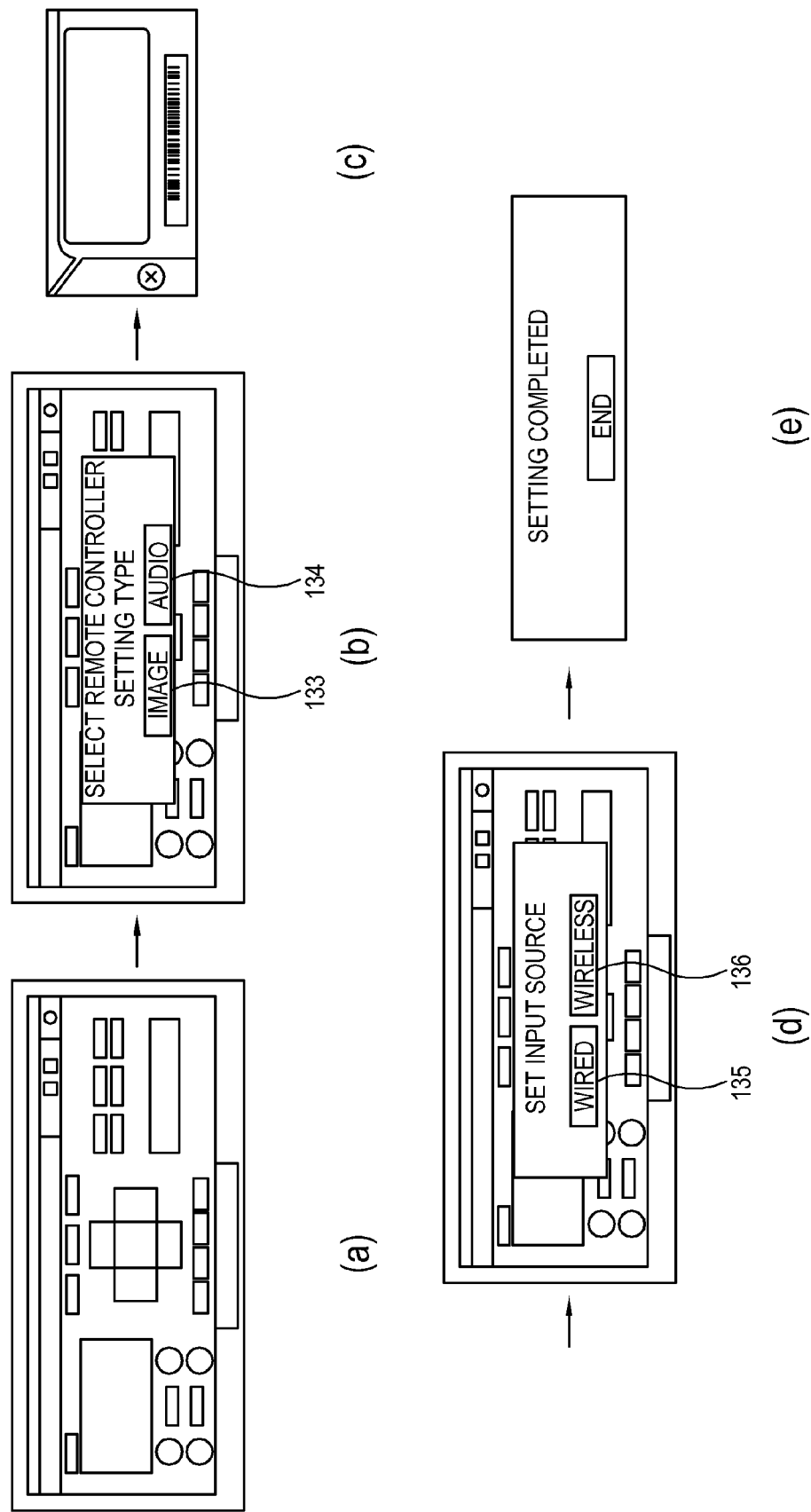
FIG. 18 illustrates an example of setting a remote control of an electronic device by a user terminal apparatus according to another exemplary embodiment.

FIG. 18 illustrates an example of setting a remote control of the electronic devices 2 to 5 by the user terminal apparatus 10 according to another exemplary embodiment.

(a) in FIG. 18 shows an application 232 for remote control of the electronic devices 2 to 5.

(b) in FIG. 18 shows selection of capturing an image or an audio input with respect to ID information of the electronic devices 2 to 5.

(c) in FIG. 18 shows an image captured for a specification including a bar code and a QR code of the electronic devices 2 to 5.

(d) in FIG. 18 shows selection of connection ports 235 and 236 of the electronic devices 2 to 5 and the display device 20.

(d) in FIG. 18 shows notification of completion of the remote control setting from the electronic devices 2 to 5.

Figure 19:
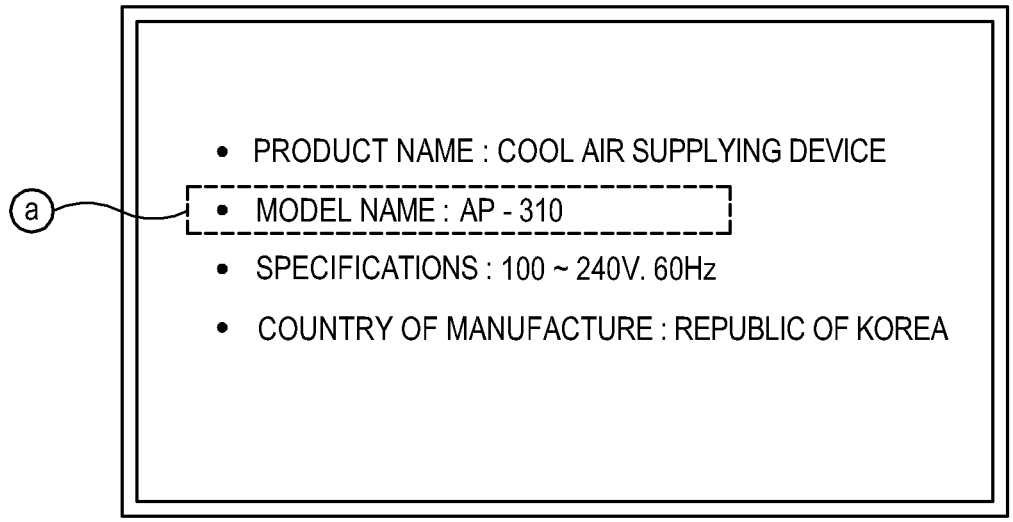
FIG. 19 illustrates an example of capturing an image of an electronic device by a user terminal apparatus according to an exemplary embodiment.

FIG. 19 illustrates an example of an image of the electronic devices 2 to 5 captured by the user terminal apparatus 10 according to an exemplary embodiment. As shown in FIG. 19, a specification of the electronic devices 2 to 5 is captured by the camera 212, and the controllers 200 and 300 may analyze the model name as shown in (a) of the captured image. The controller 200 may request the external server to transmit a control key for remote control of the analyzed model name, request the display device 20 to transmit a control key for the analyzed model name, or directly receive the control key from the electronic devices 2 to 5 in a wireless manner. Although it is described that the user terminal apparatus 10 is used for the remote control setting in this exemplary embodiment, it should be noted that the user terminal apparatus 11 may also be used for remote control setting in a similar manner.

Figure 20:
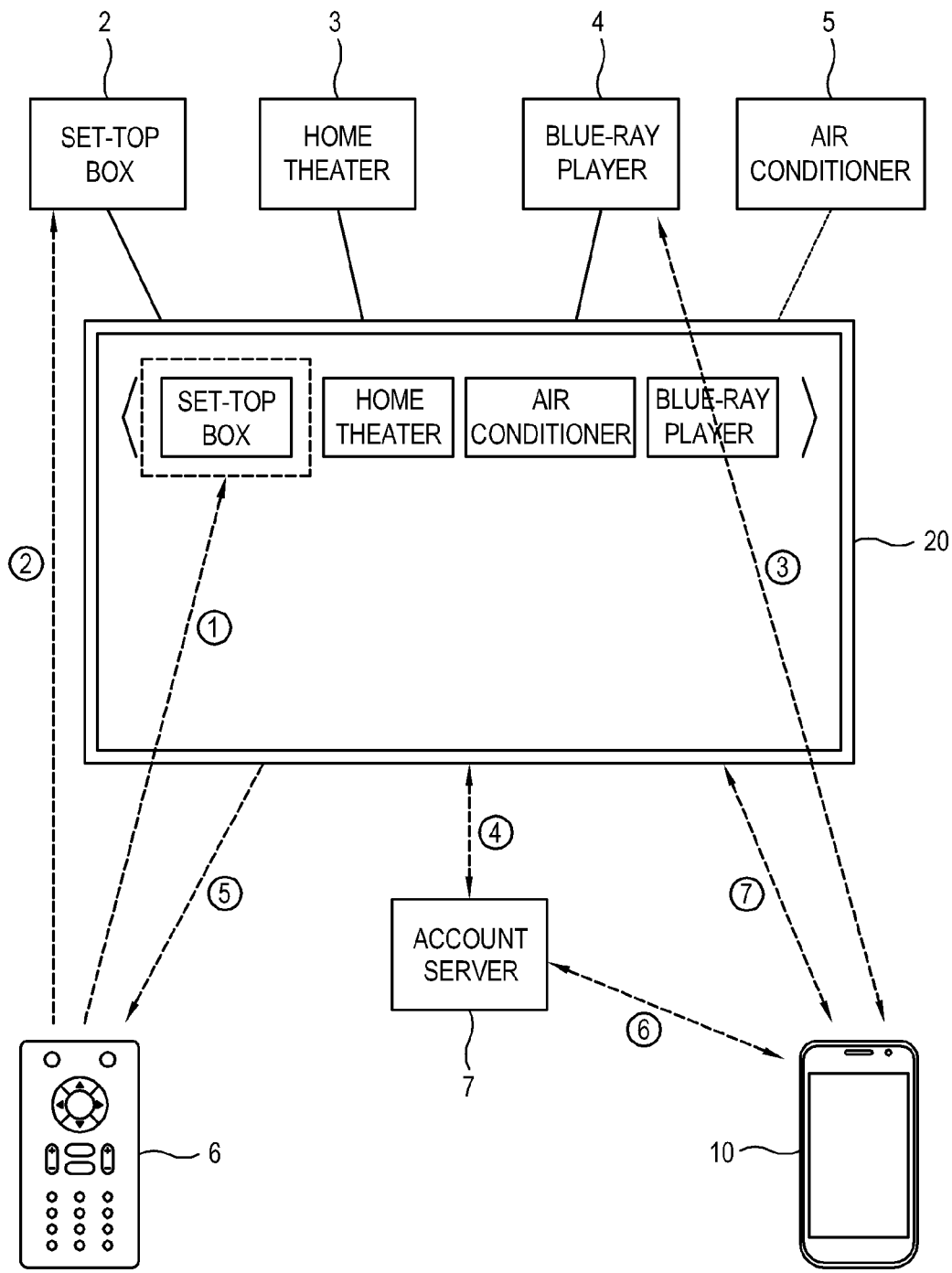
FIG. 20 illustrates an example of setting a remote control and sharing remote control setting information by a user terminal apparatus and a display device according to an exemplary embodiment.

FIG. 20 illustrates an example of setting remote control and sharing remote control setting information by the user terminal apparatus 10 and the display device 20 according to an exemplary embodiment.

FIG. 20 shows a remote control by the remote controller 6. When the display device 20 is turned on, the remote controller 6 checks the peripheral electronic devices 2 to 5 connected to the display device 20 and checks whether the remote control setting has been performed to one of the electronic devices 2 to 5, e.g., the set-top box 2. If not, the display device 20 requests the set-top box 2 or the external server 7 to transmit a control key for corresponding to the set-top box 2. The display device 20 transmits the received control key to the remote controller 6 as indicated by a dashed arrow line ⑤ so that the remote controller 6 may remotely control the set-top box 2 as indicated by a dashed arrow line ②. When an external input button of the remote controller 6 is pressed, the display device 20 may display an external input selection screen to control the peripheral electronic devices 2 to 5 and allow the remote controller 6 to remotely control the electronic devices 2 to 5.

A dashed arrow line ③ shows a remote control setting of the blue-ray player 4 by the user terminal apparatus 10. If the application 232 for remote control of the electronic devices 2 to 5 is executed, the controller detects the blue-ray player 4 for which no remote control setting has been performed and captures specification information of the blue-ray player 4 through the camera 212 of the user terminal apparatus 10 or 11. The user terminal apparatus 10 requests the blue-ray player 4, the display device 20, or the external server 7 to transmit a control key to remotely control the blue-ray player 4 and receives the control key therefrom. When the connection port of the blue-ray player 4 and the display device 20 is selected and set in a wired manner, the user terminal apparatus 10 may remote control the blue-ray player 4.

A dashed arrow line ④ shows the displays device 20 which may transmit a control key of the set-top box 2 to the external server 7 and receive setting information including a control key for remote control of the blue-ray player 4. The display device 20 receives the control key of the connected set-top box 2 from the external server 7 and transmits the control key to the remote controller 6 to remotely control the set-top box 2 through the remote controller 6. Also, the display device 20 may log in the account server 7 with the user account and transmit the remote control setting information including the control key for the set-top box 2 to the user account of the external account server 7 to upload the setting information thereof. In this exemplary embodiment, it is described that the external server 7 and the external account server 7 are integrally provided. Alternatively, the external server 7 and the account server 7 may be separately provided.

The display device 20 may be set to automatically log in to the user account once the display device 20 is turned on. The display device 20 may log in the user account, check the remote control setting information of the blue-ray player 4 uploaded to the user account, and receive the remote control setting information of the blue-ray player 4 for which no remote control setting has been previously performed. Since the remote control setting information of the blue-ray player 4 has been updated by the user terminal apparatus, the display device 20 may receive the remote control setting information of the blue-ray player 4, and transmit the setting information to the remote controller 6 to remotely control the blue-ray player 4 as indicated by the dashed arrow line ⑤.

A dashed arrow line ⑥ shows the user terminal apparatus 10 which may transmit a control key of the blue-ray player 4 to the external server 7 and receive setting information including a control key for remote control of the set-top box 2.

In the process shown in the dashed arrow line ③, the user terminal apparatus 10 receives the control key of the blue-ray player 4 and, in the process shown in the dashed arrow line ⑥, may log in the user account and transmit the remote control setting information including the control key for the blue-ray player 4 to the user account of the external account server 7 to upload the setting information to the user account. Also, the user terminal apparatus 10 may log in the user account, check the remote control setting information of the set-top box 2 uploaded to the user account, and receive the remote control setting information of the set-top box 2 for which no remote control setting has been performed. Since the remote control setting information of the set-top box 2 has been updated by the display device 20, the user terminal apparatus 10 may receive the remote control setting information of the set-top box 2 and remotely control the set-top box 2.

The display device 20 and the user terminal apparatus 10 may exchange the remote control setting information of the electronic devices 2 to 5 with the external server 7, and as indicated by a dashed arrow line ⑦, the user terminal apparatus 10 may directly transmit the remote control setting information of the electronic devices 2 to 5 to the display device 20, and the display device 20 may directly transmit the control remote setting information to the user terminal apparatus 10. Although it is described that the user terminal apparatus 10 is used for the remote control setting in this exemplary embodiment, it should be noted that the user terminal apparatus 11 may also be used for remote control setting in a similar manner.

Figure 21:
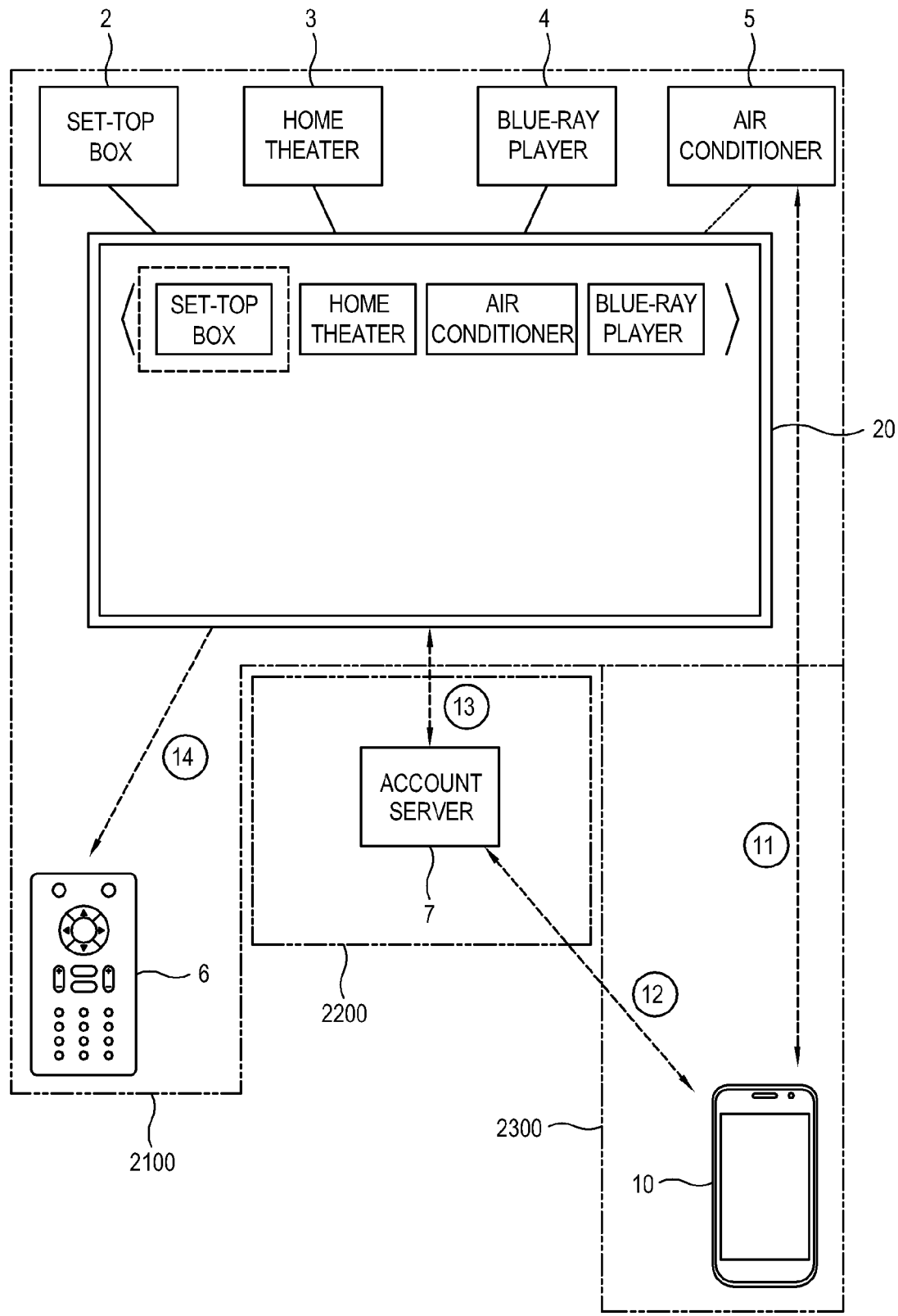
FIG. 21 illustrates an example of setting a remote control of an electronic device by a user terminal apparatus and sharing remote control setting information through an external server according to an exemplary embodiment.

FIG. 21 illustrates an example of user terminal apparatus 10 which performs a remote control setting for the electronic devices 2 to 5 and shares remote control setting information through the external server 7.

In an exemplary embodiment, a user may perform the remote control setting (⑪) for the air conditioner 5 in an area 2300 outside a user's home, wherein the electronic devices 2 to 5 are placed in an area 2100 inside the user's home. When the remote control setting is performed for the air conditioner 5, the user terminal apparatus 10 may transmit the remote control setting information of the air conditioner 5 to the user account of the external account server 7, which is located in a remote area 2200 (⑫). In this case, when the display device 20 logs in to the user account of the external account server 7, the display device 20 may receive the remote control setting information of the air conditioner 5 which has been set by the user terminal apparatus 10 (⑬) and transmit the setting information to the remote controller 6 (⑭). Accordingly, the remote controller 6 may remotely control the electronic devices 2 to 5 without performing the remote control setting process.

In another exemplary embodiment, when electronic devices 2 to 5 are newly purchased, or a connection of the electronic devices 2 to 5 and the display device 20 is changed such that a remote control setting needs to be performed for the electronic devices 2 to 5, or when a user who is away from home wants to remotely control the electronic devices 2 to 5, the user may log in to the external account server 7 with the user account through the user terminal apparatus 10 to receive remote control setting information of the electronic devices 2 to 5. Thus, the electronic devices 2 to 5 may be remotely controlled through the user terminal apparatus 10 without performing the remote control setting process for each of the electronic devices 2 to 5.

The user terminal apparatus 10 may input ID information of the electronic devices 2 to 5 with images and audio to receive a control key corresponding to the electronic devices 2 to 5 and thus the user may remotely control the electronic devices 2 to 5 without much difficulty.

The user terminal apparatus 10 or the display device may log in the external account server 7 with the user account and perform the remote control setting for the electronic devices 2 to 5.

Although it is described that the user terminal apparatus 10 is used for the remote control setting in this exemplary embodiment, it should be noted that the user terminal apparatus 11 may also be used for remote control setting in a similar manner.

The display device according to exemplary embodiments receives the ID information of peripheral electronic devices connected to the display device, receives the control key of the remote controller 6 with respect to an electronic device for which no remote controller 6 has been set, and transmits the control key to the remote controller 6 to automatically set the control key corresponding to the ID information. Thus, the control setting process may be simplified and easier.

The user terminal apparatus according to exemplary embodiments inputs ID information of an electronic device through an image and an audio and receives a control key corresponding to the electronic device and may remotely control the electronic device by using the received control key without much difficulty.

The user terminal apparatus or the display device according to exemplary embodiments logs in a user account of an external server and perform remote control setting of the electronic device using control setting information of the electronic device received from the external server without much difficulty.

Although a few exemplary embodiments have been shown and described, it will be appreciated by those skilled in the art that changes may be made in these exemplary embodiments without departing from the principles and spirit of the inventive step, the range of which is defined in the appended claims and their equivalents.

What is claimed is:

1. A control method of a user terminal apparatus, the control method comprising:
   executing an application, stored in the user terminal apparatus, for remote control of a plurality of electronic devices connectable to the user terminal apparatus;
   transmitting to a display device a request with regard to the plurality of electronic devices;
   selecting an electronic device among the plurality of electronic devices;
   receiving ID information of the selected electronic device from the display device, the display device being separate from the electronic device;
   transmitting, to another device, the received ID information of the electronic device to request for a control key, corresponding to the electronic device;
   receiving, from the another device, the control key corresponding to the electronic device based on the transmitted ID information; and
   remotely controlling, by using the application, an operation of the electronic device by using the received control key.

2. The control method according to claim 1, wherein the receiving the ID information comprises receiving the ID information of the electronic device comprising at least one of an image and an audio related to the electronic device, analyzing the at least one of the received image and the received audio, and determining the ID information of the electronic device.

3. The control method according to claim 1, wherein the receiving the control key corresponding to the electronic device comprises setting a connection port with respect to the electronic device and the display device, respectively.

4. The control method according to claim 1, further comprising:
   receiving the control key from at least one of the electronic device and an external server.

5. The control method according to claim 1, further comprising:
   connecting to an external server and logging in to a user account of the external server; and
   transmitting remote control setting information corresponding to the electronic device to the external server to upload the remote control setting information to the user account.

6. The control method according to claim 5, wherein the remote control setting information comprises the control key corresponding to the electronic device.

7. A user terminal apparatus comprising:
   an input part configured to receive ID information of an electronic device comprising at least one of an image and an audio related to the electronic device;
   a storage configured to store an application for remote control of the electronic device;
   a communication part configured to transmit and receive data; and
   a controller configured to transmit to a display device a request with regard to a plurality of electronic devices remotely controllable by the user terminal apparatus, to select an electronic device among the plurality of electronic devices, to receive ID information of the selected electronic device from the display device, the display device being separated from the electronic device, and to transmit the received ID information of the electronic device to request for a control key corresponding to the electronic device, to another device, control the communication part to receive, from the another device, the control key corresponding to the electronic device based on the transmitted ID information, and remotely control an operation of the electronic device by controlling the application by using the received control key.

8. The user terminal apparatus according to claim 7, wherein the input part comprises a camera to capture the image and a microphone to receive the audio, and the controller analyzes the captured image and the received audio and determines the ID information of the electronic device.

9. The user terminal apparatus according to claim 7, wherein the controller sets a connection port with respect to the electronic device and the display device, respectively.

10. The user terminal apparatus according to claim 7, wherein the controller further receives the control key from at least one of the electronic device and an external server.

11. The user terminal apparatus according to claim 7, wherein the controller is connected to an external server and logs in to a user account of the external server and transmit remote control setting information corresponding to the electronic device to the external server to upload the remote control setting information to the user account.

12. The user terminal apparatus according to claim 11, wherein the remote control setting information comprises the control key corresponding to the electronic device.

13. A control method of a user terminal apparatus, the control method comprising:
   transmitting to a display device a request with regard to a plurality of electronic devices;

selecting an electronic device among the plurality of electronic devices;

receiving ID information of the selected electronic device, from the display device;

transmitting, to the display device, the received ID information of the electronic device to request for remote control setting information corresponding to the electronic device;

receiving the remote control setting information corresponding to the electronic device, from the display device;

connecting to an external server and logging in to a user account of the external server;

uploading, to the user account of the external server, the received remote control setting information;

obtaining second remote control setting information of the electronic device uploaded to the user account, wherein the second remote control setting information has been previously uploaded by the display device by logging in the external server with the user account; and remotely controlling the electronic device by using at least one of the remote control setting information and the second remote control setting information.

14. A user terminal apparatus comprising:

a communication part configured to transmit and receive data;

a user input part configured to receive a user's input; and a controller configured to:

transmit to a display device a request with regard to a plurality of electronic devices, select an electronic device among the plurality of electronic devices, receive ID information of the selected electronic device, from the display device, and transmit, to the display device, the received ID information of the electronic device to request for remote control setting information corresponding to the electronic device, control the communication part to receive remote control setting information corresponding to the electronic device, from the display device, connect to an external server and log in the external server with a user account to upload, to the user account of the second external server, the received remote control setting information, obtain second remote control setting information of the electronic device uploaded to the user account, wherein the second remote control setting information has been previously uploaded by the display device by logging in the external server with the user account, and remotely control the electronic device by using at least one of the remote control setting information and the second remote control setting information.

15. A user terminal apparatus comprising:

a storage configured to store an application for remote control of a plurality of electronic devices, connected to the user terminal apparatus, and ID information of the plurality of electronic devices;

a user input part configured to receive a user command for remote control of an electronic device among the plurality of electronic devices;

a communication part configured to transmit and receive data from and to a display device, the display device being separate from the electronic device and connected to the electronic device; and a controller configured to, in response to the user command, determine whether remote control setting is performed for the electronic device, control the communication part to transmit to a display device a request with regard to the plurality of the electronic device, to select an electronic device among the plurality of electronic devices, receive a control key corresponding to the electronic device from another device based on the ID information of the electronic device, and remotely control an operation of the electronic device by controlling the application by using the received control key.

16. The user terminal apparatus of claim 15, further comprising a display unit, wherein the ID information is stored and displayed in an image on the display unit.

17. The user terminal apparatus of claim 16, wherein, when the image displayed on the display unit is selected, the application for remote control is executed with respect to an electronic device of which ID information corresponds to the selected image.

18. The user terminal apparatus according to claim 15, wherein the communication part obtains the control key corresponding to the electronic device from the electronic device.

* * * * *